Figure 1:
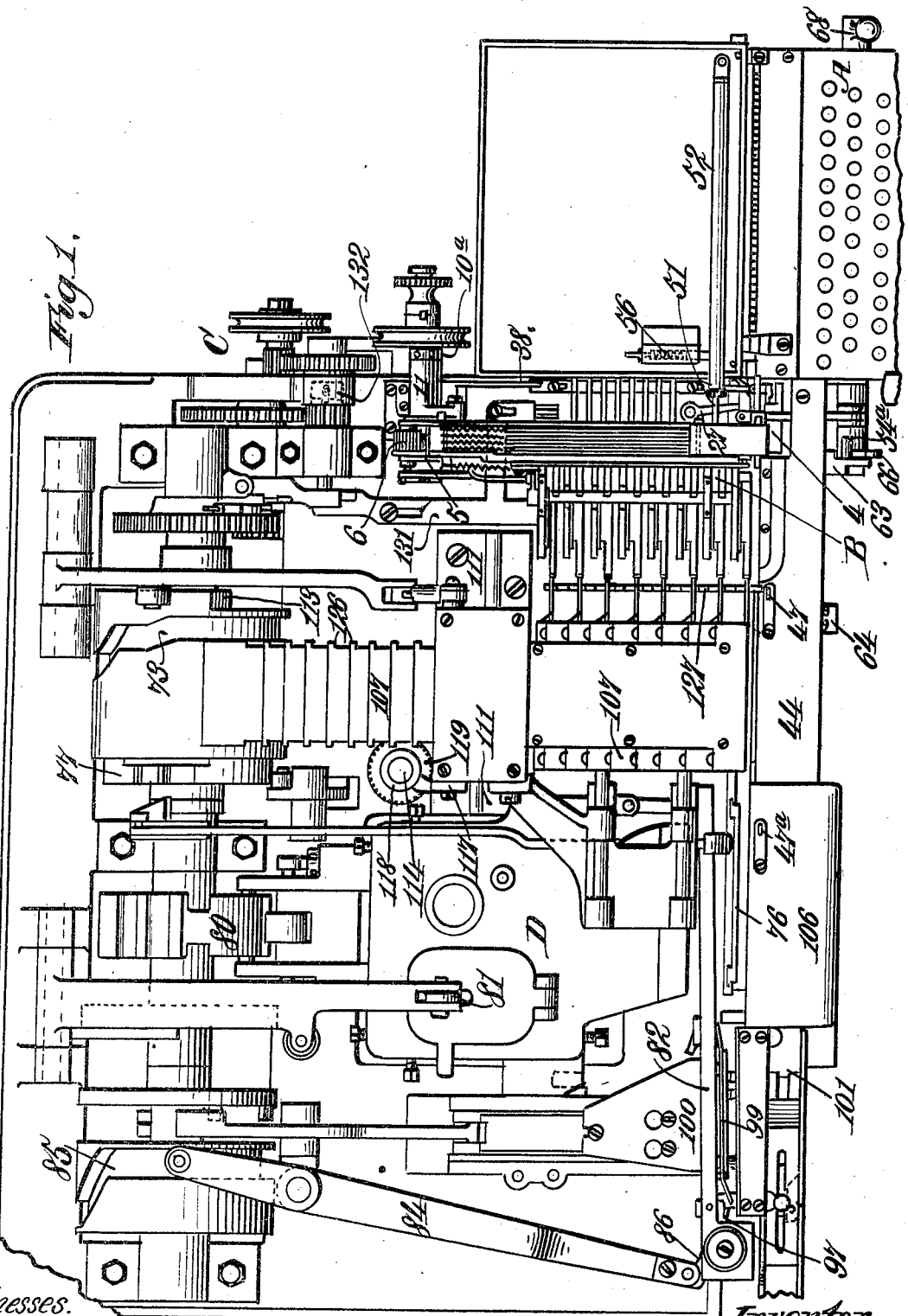

No. 847,021. PATENTED MAR. 12, 1907.
J. McNAMARA.
MONOLINE COMPOSING MACHINE.
APPLICATION FILED JULY 14, 1905.

17 SHEETS—SHEET 2.

Witnesses.
Robert Everett,
Geo. W. Rea.

Inventor.
James McNamara.
By James L. Norris
Atty.

No. 847,021. PATENTED MAR. 12, 1907.
J. McNAMARA.
MONOLINE COMPOSING MACHINE.
APPLICATION FILED JULY 14, 1905.

17 SHEETS—SHEET 3.

Witnesses.
Robert Ewitt,
Jno. W. Rea.

Inventor.
James McNamara.
By James L. Norris.
Atty.

No. 847,021. PATENTED MAR. 12, 1907.
J. McNAMARA.
MONOLINE COMPOSING MACHINE.
APPLICATION FILED JULY 14, 1905.
17 SHEETS—SHEET 4.
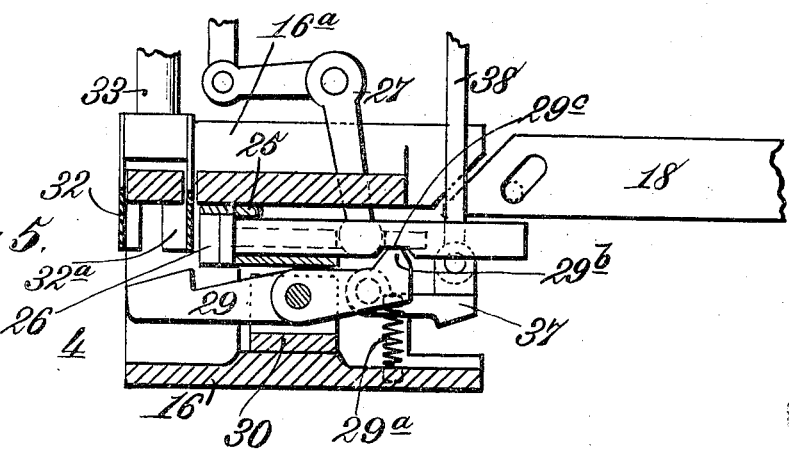
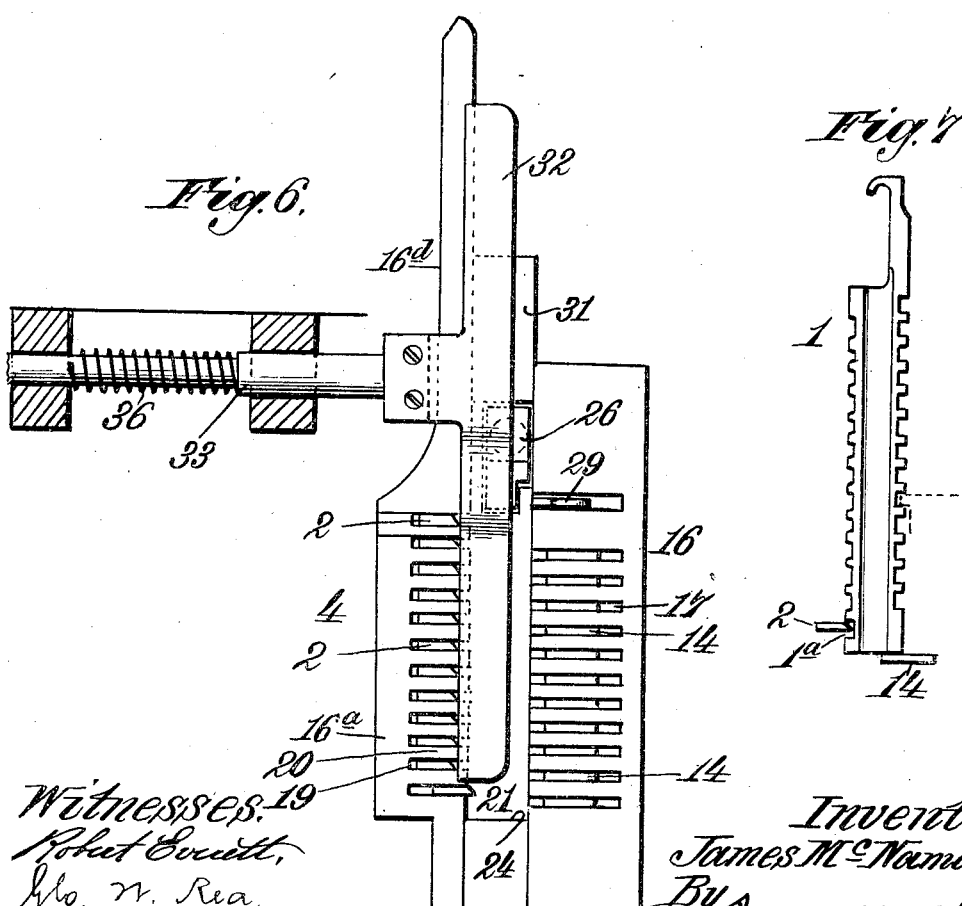
Witnesses.
Robert Everitt,
Geo. N. Rea.
Inventor.
James McNamara.
By James L. Norris.
Att'y.

No. 847,021. PATENTED MAR. 12, 1907.
J. McNAMARA.
MONOLINE COMPOSING MACHINE.
APPLICATION FILED JULY 14, 1905.
17 SHEETS—SHEET 5.
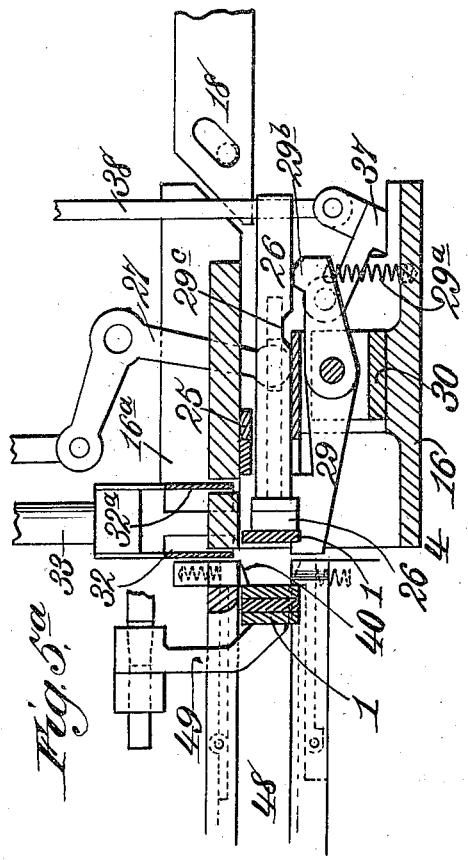
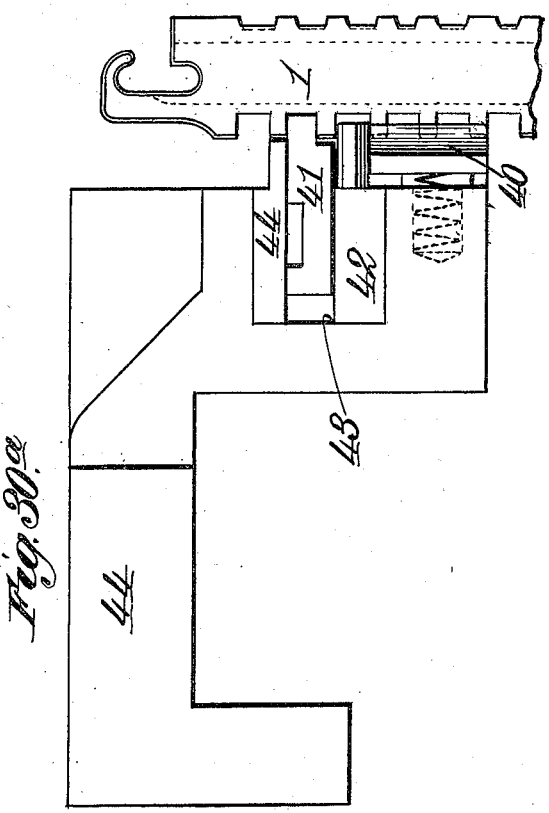
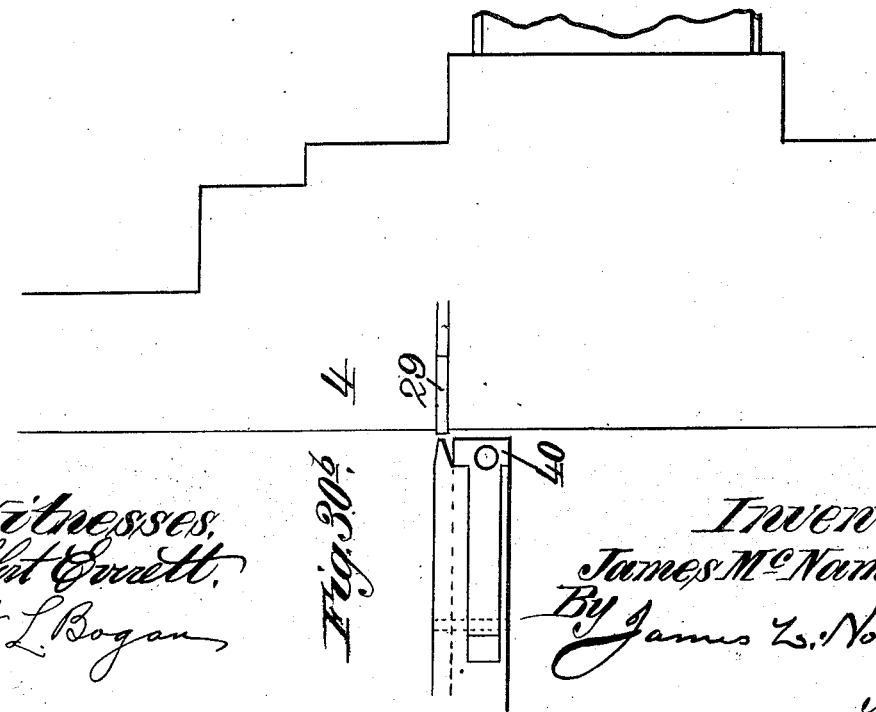
Witnesses
Inventor:
James McNamara
By James L. Norris
Atty.

No. 847,021. PATENTED MAR. 12, 1907.
J. McNAMARA.
MONOLINE COMPOSING MACHINE.
APPLICATION FILED JULY 14, 1905.
17 SHEETS—SHEET 6.
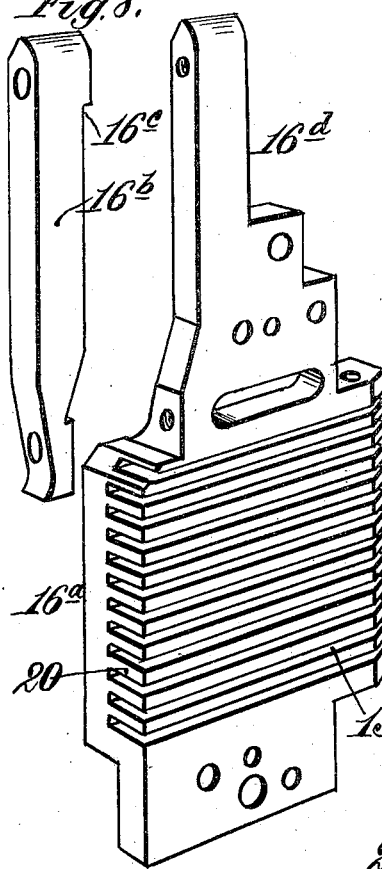
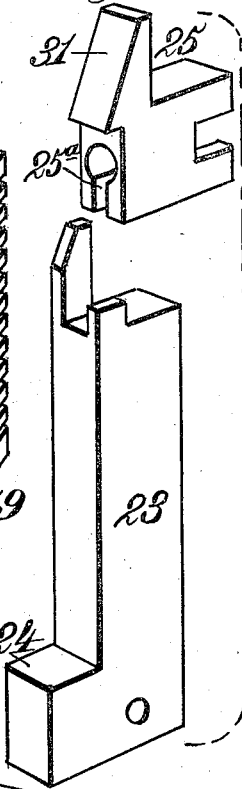
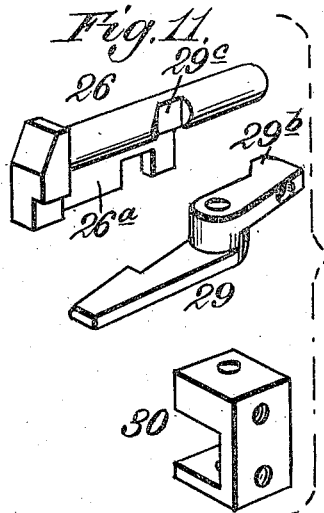
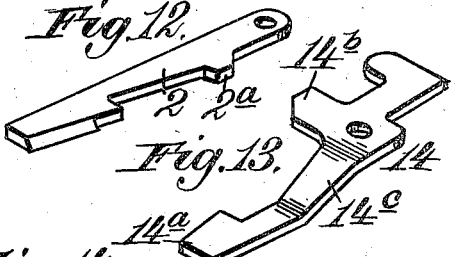
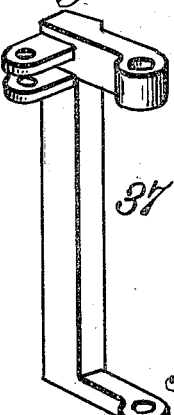
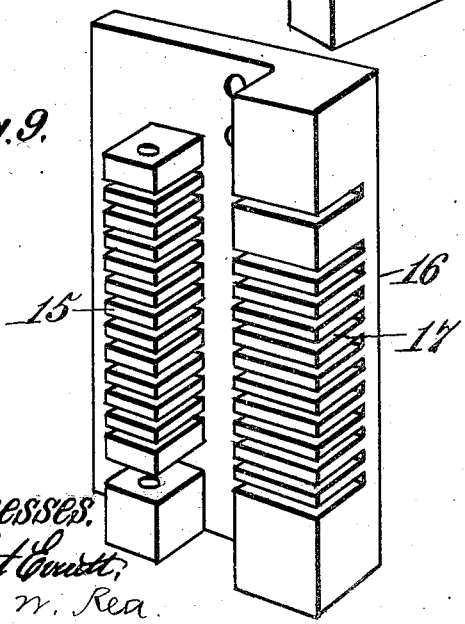
Inventor:
James McNamara.
By James L. Norris.
Atty.
Witnesses.
Robert Everett,
Geo. W. Rea.

No. 847,021.                                    PATENTED MAR. 12, 1907.
J. McNAMARA.
MONOLINE COMPOSING MACHINE.
APPLICATION FILED JULY 14, 1905.
17 SHEETS—SHEET 7.
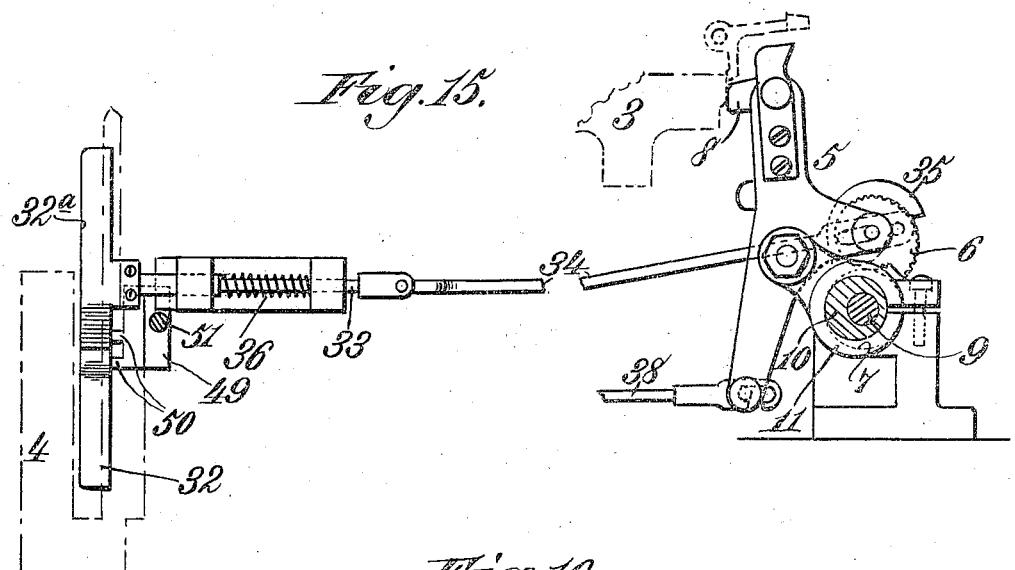
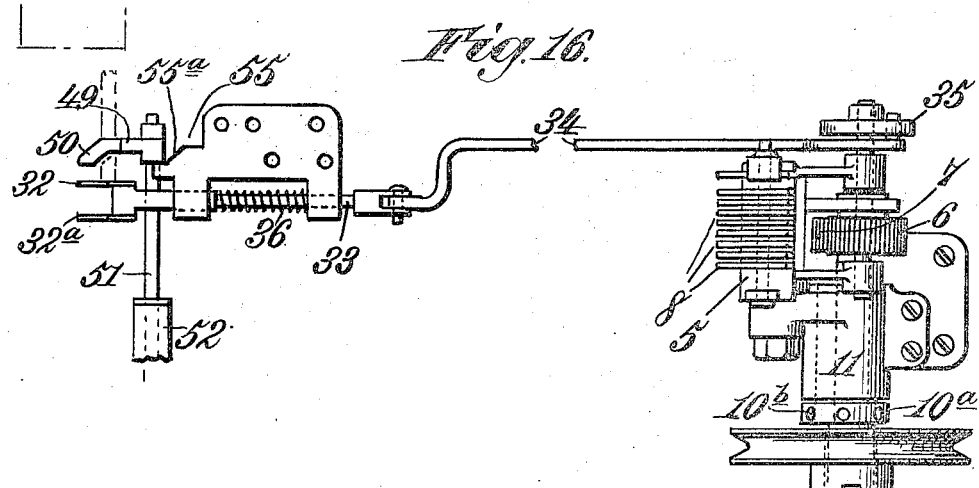
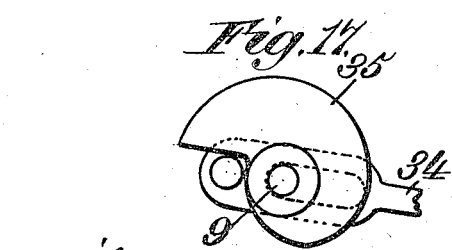
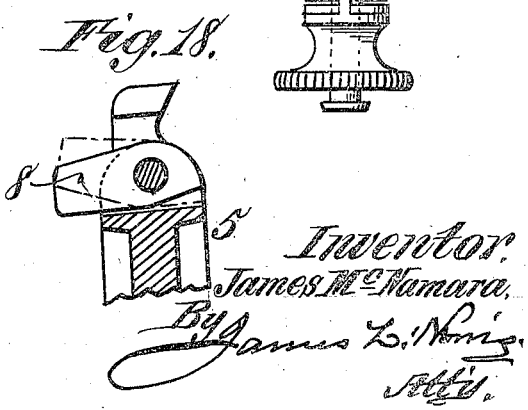
Witnesses,
Robert Everitt,
Geo. W. Rea
Inventor,
James McNamara,
By James L. Norris
Atty.

No. 847,021. PATENTED MAR. 12, 1907.
J. McNAMARA.
MONOLINE COMPOSING MACHINE.
APPLICATION FILED JULY 14, 1905.
17 SHEETS—SHEET 8.
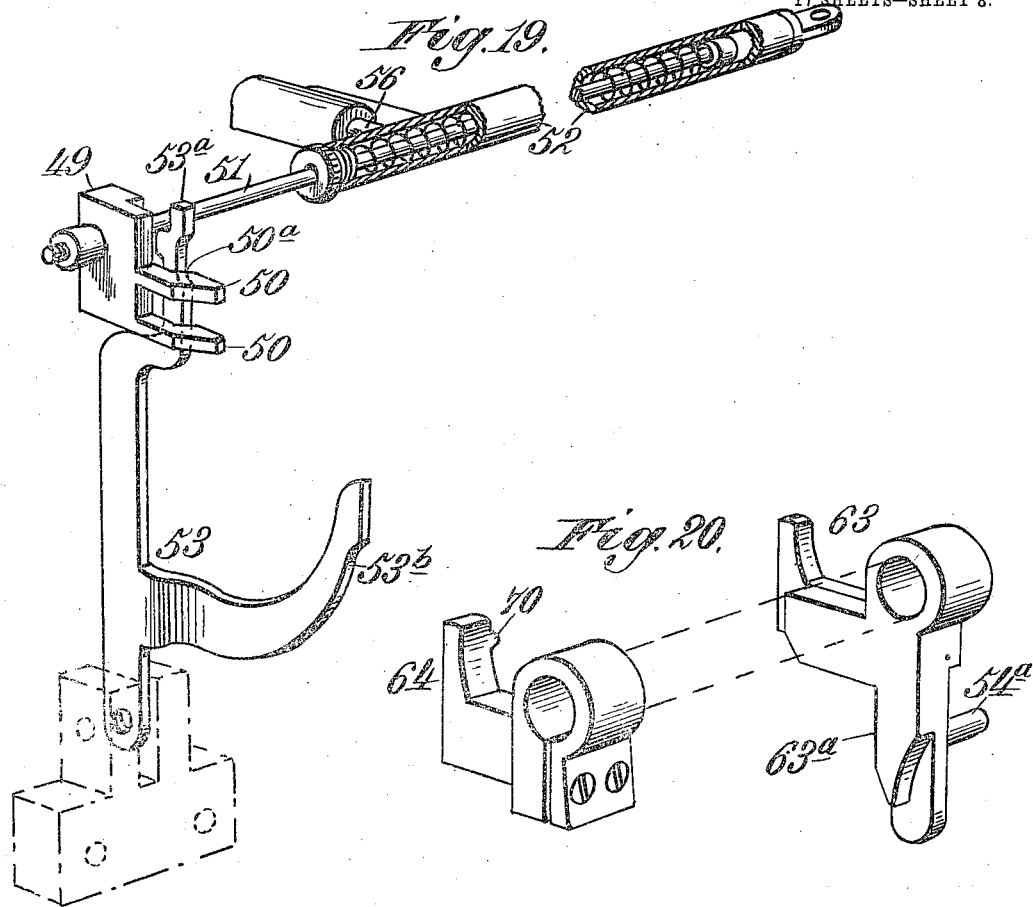
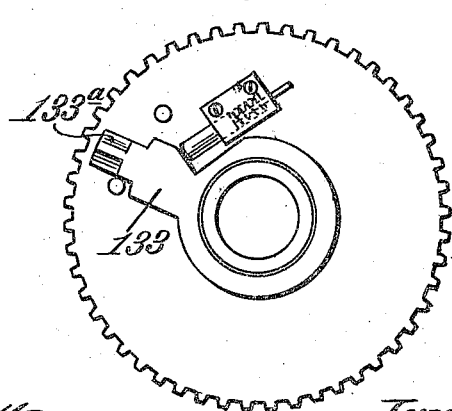
Witnesses.
Robert Everett,
Jno. W. Rea.
Inventor.
James McNamara.
By James L. Norris
Atty.

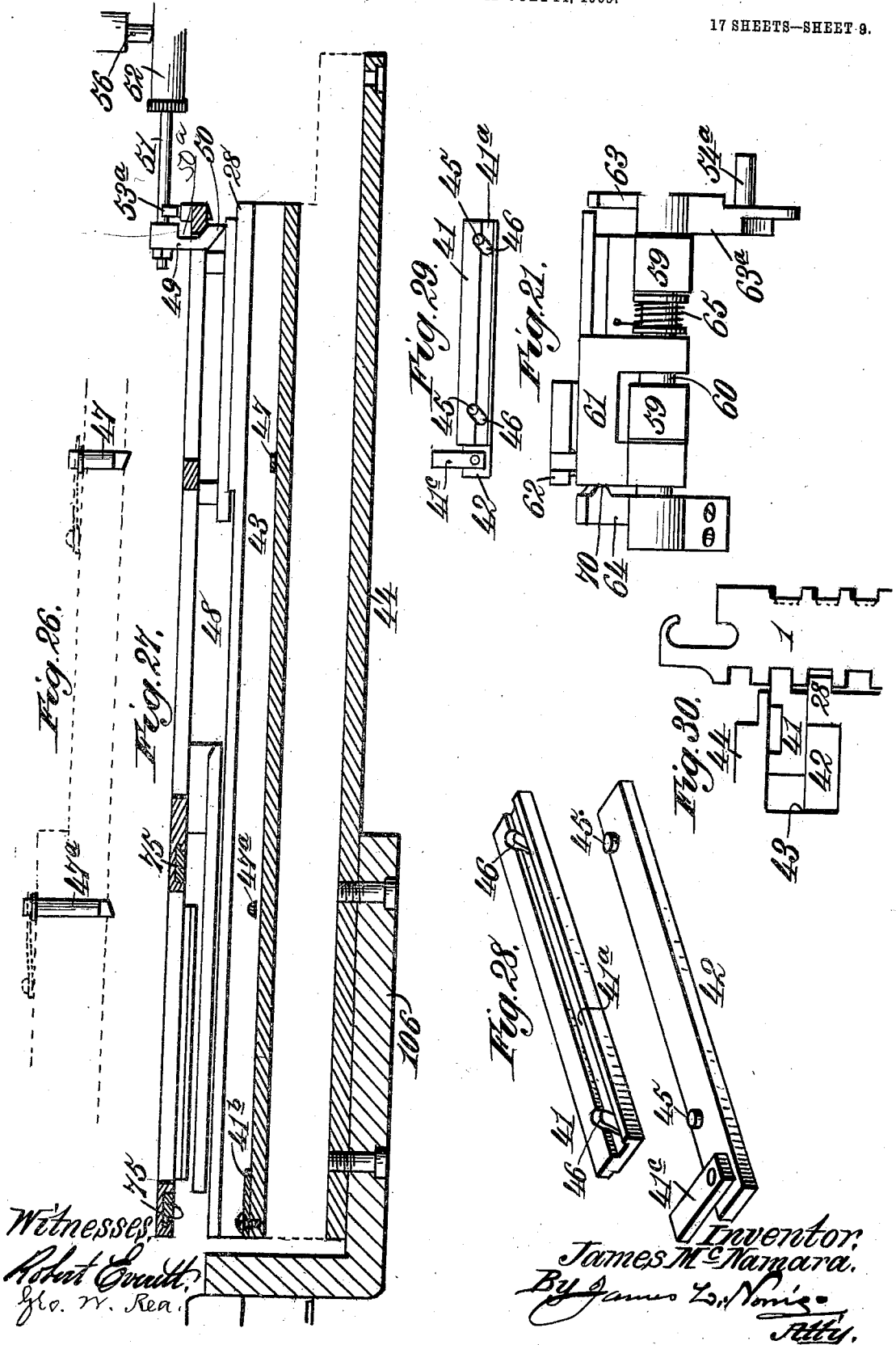

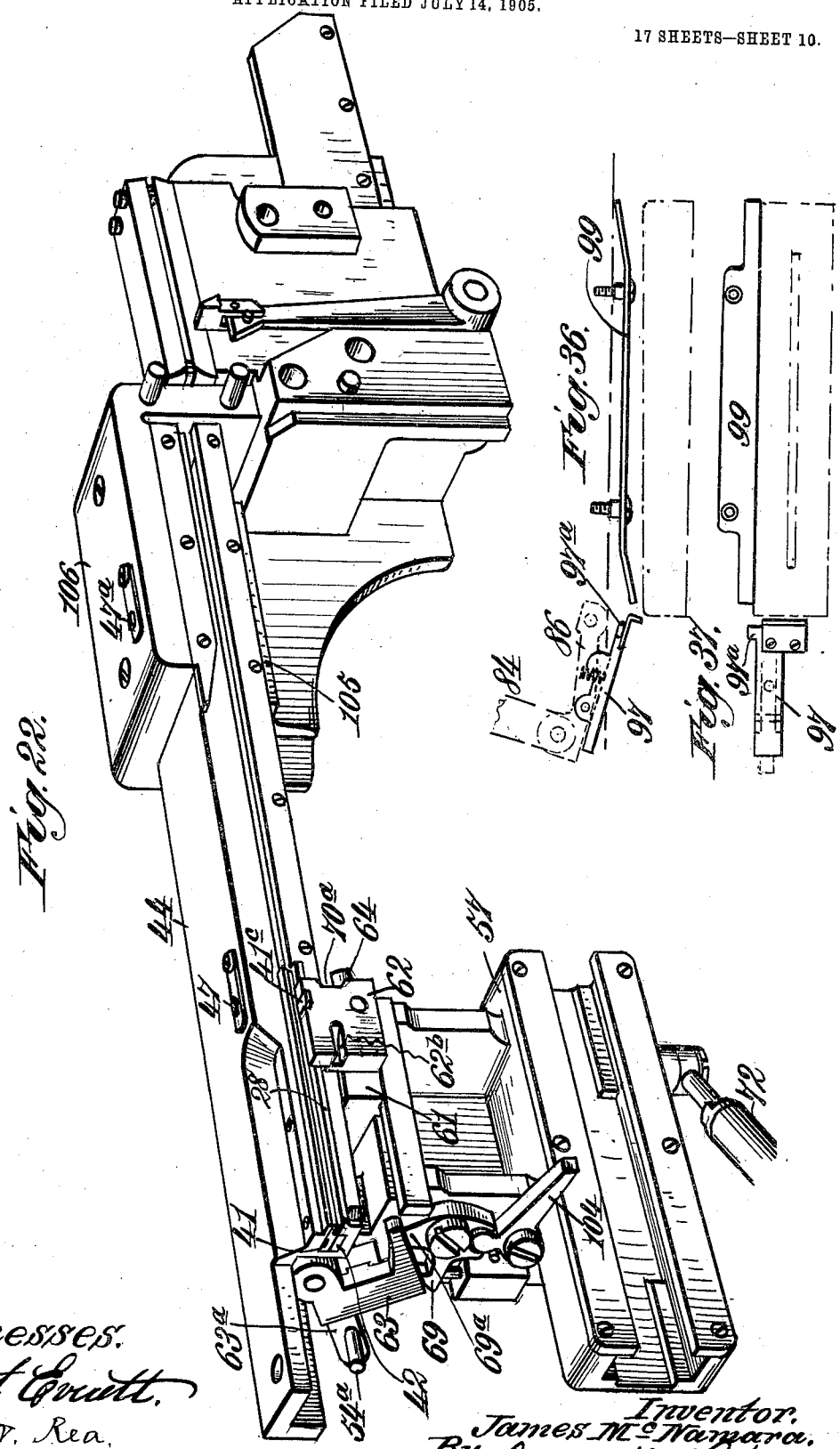

No. 847,021. PATENTED MAR. 12, 1907.
J. McNAMARA.
MONOLINE COMPOSING MACHINE.
APPLICATION FILED JULY 14, 1905.

17 SHEETS—SHEET 11.

Witnesses.
Inventor:
James McNamara,
By James L. Norris
Atty.

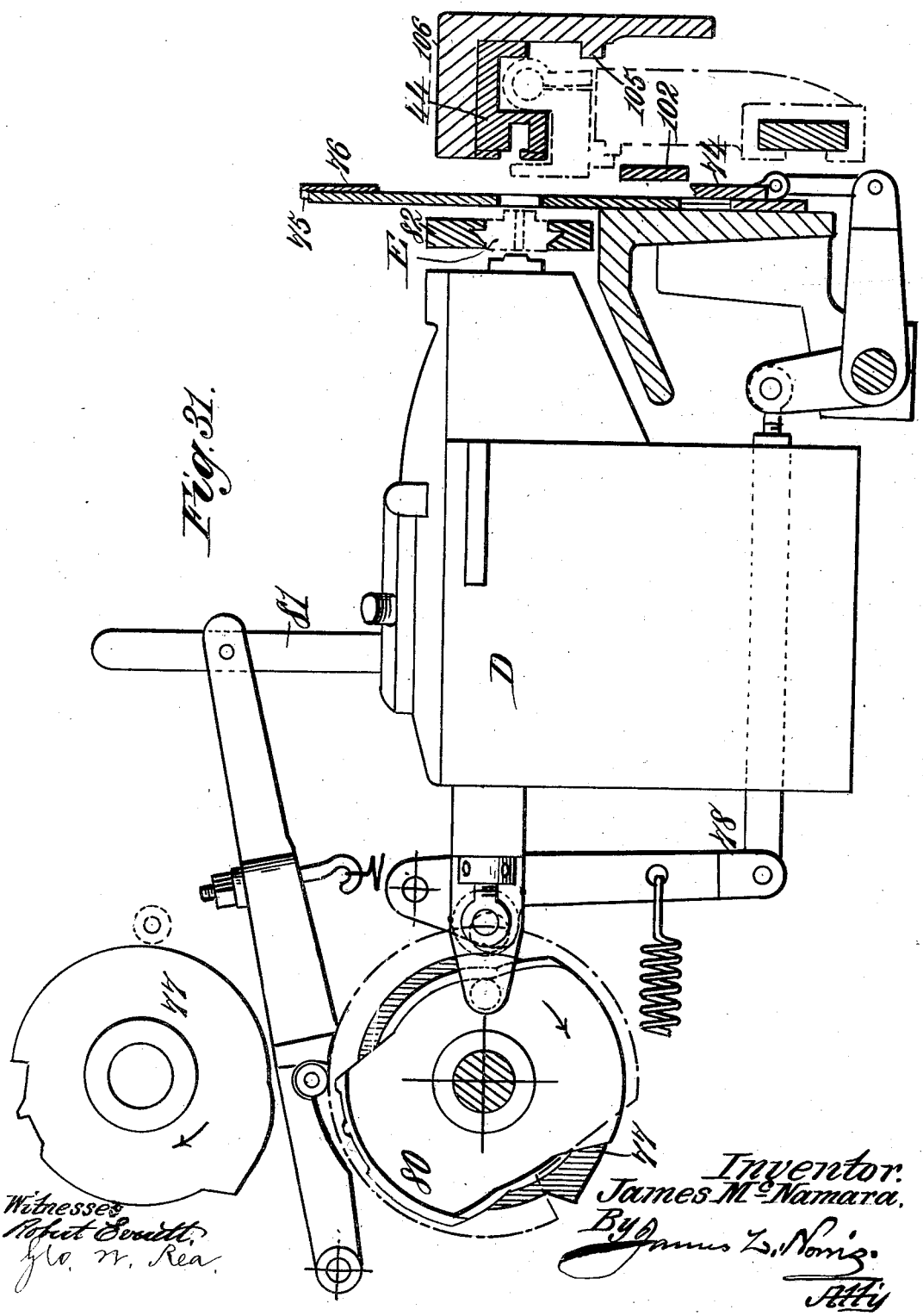

No. 847,021. PATENTED MAR. 12, 1907.
J. McNAMARA.
MONOLINE COMPOSING MACHINE.
APPLICATION FILED JULY 14, 1905.
17 SHEETS—SHEET 13.
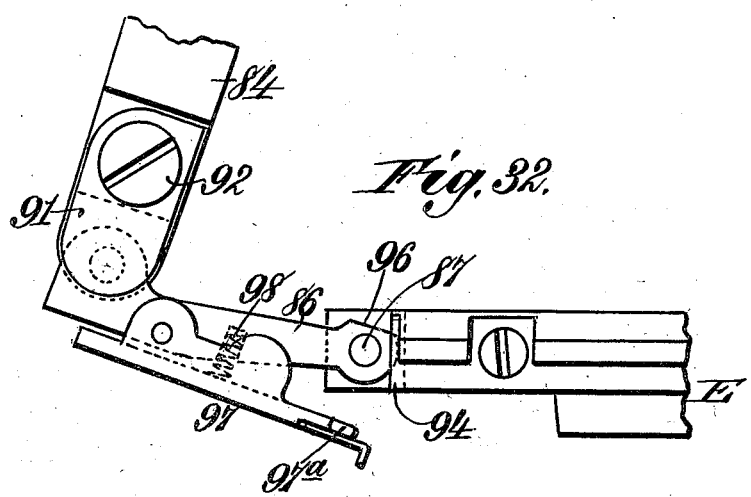
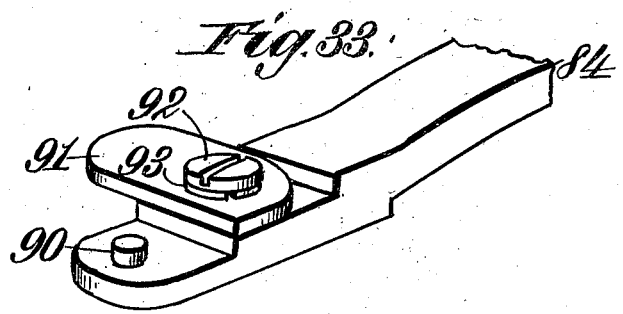
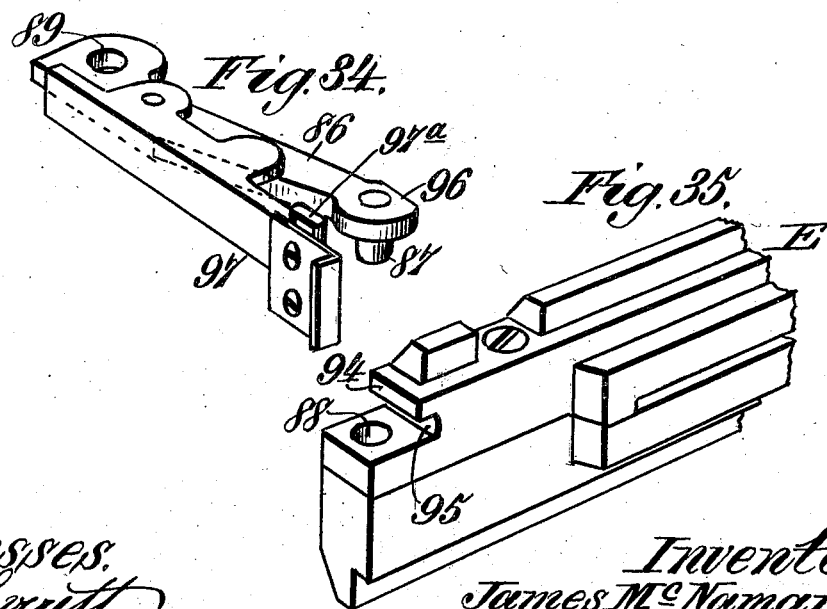

No. 847,021. PATENTED MAR. 12, 1907.
J. McNAMARA.
MONOLINE COMPOSING MACHINE.
APPLICATION FILED JULY 14, 1905.
17 SHEETS—SHEET 14.
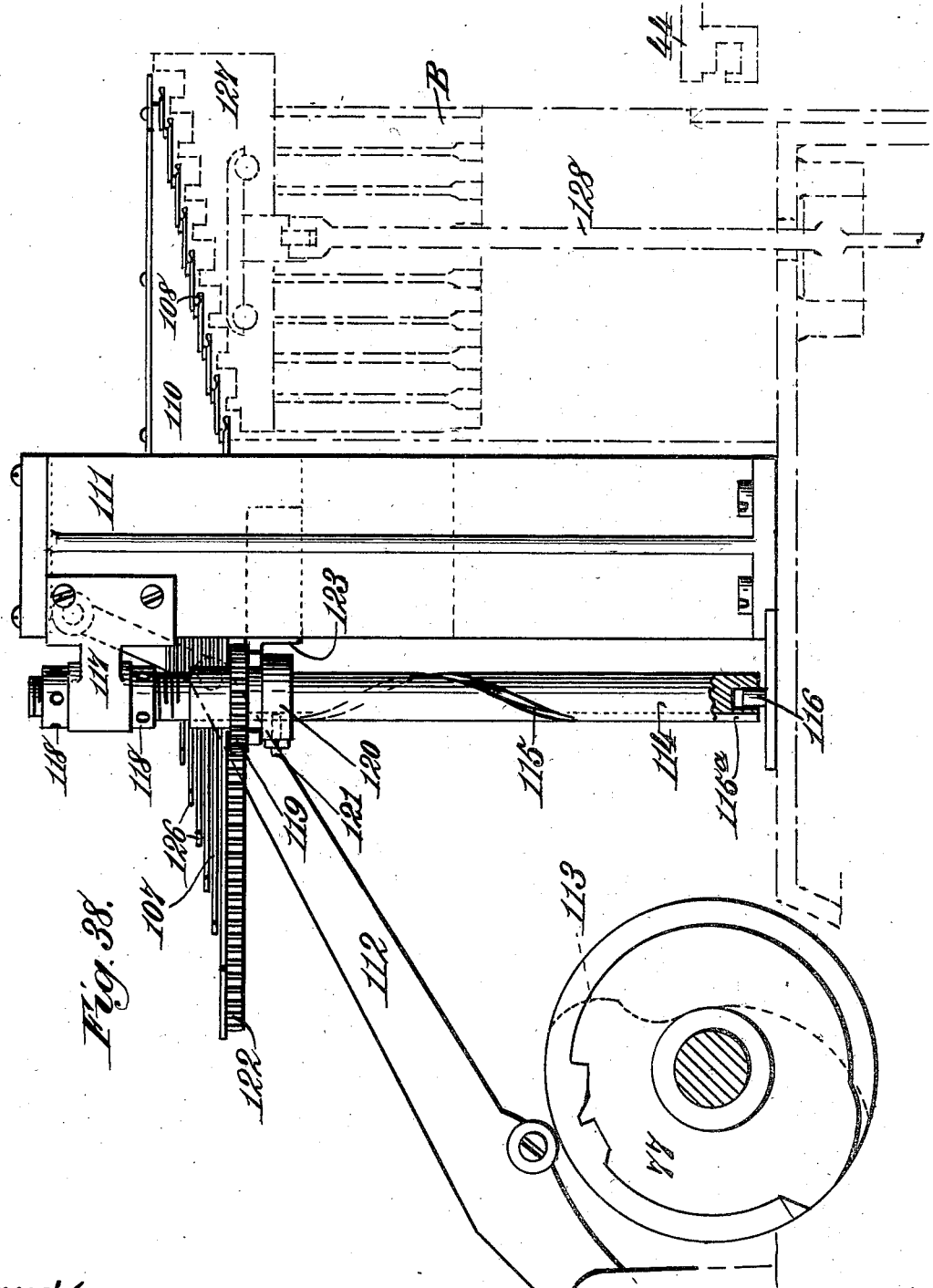
Witnesses.
Robert Everett,
Geo. W. Rea.
Inventor:
James McNamara.
By James L. Norris
Atty.

No. 847,021. PATENTED MAR. 12, 1907.
J. McNAMARA.
MONOLINE COMPOSING MACHINE.
APPLICATION FILED JULY 14, 1905.
17 SHEETS—SHEET 15.
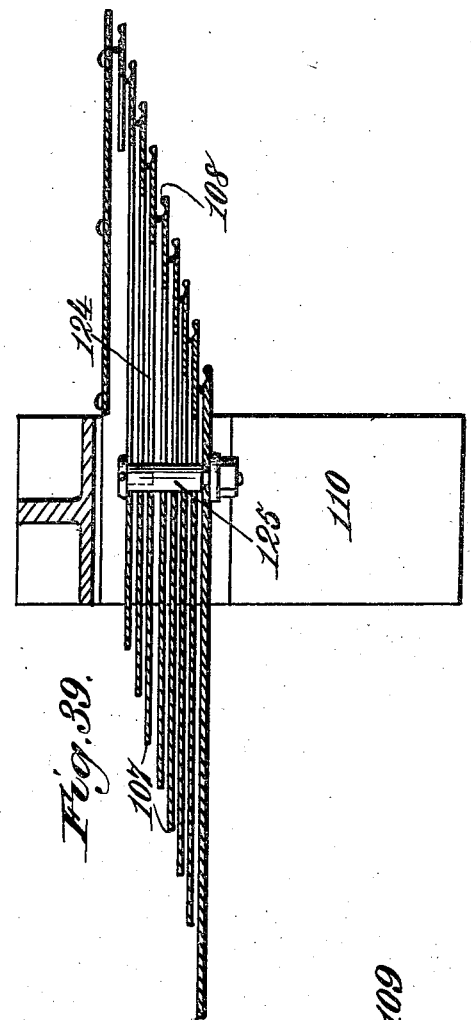
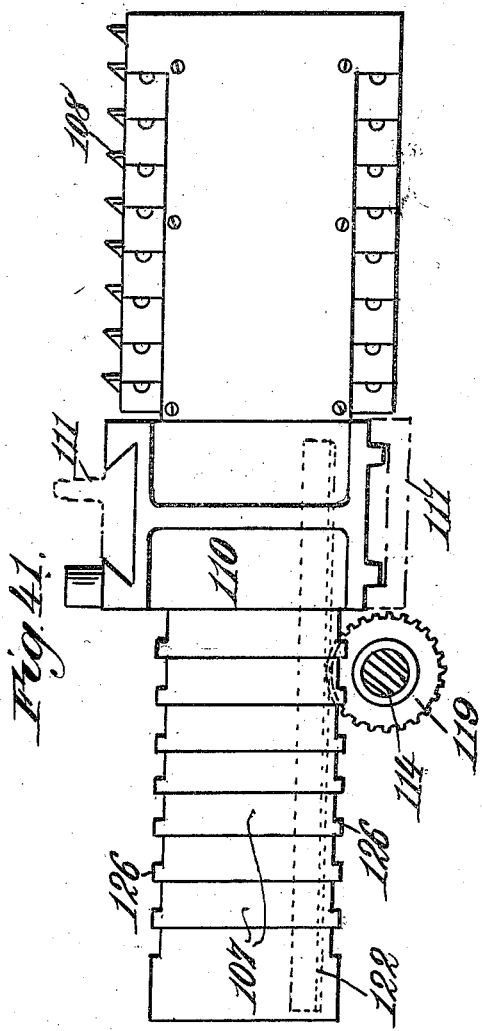
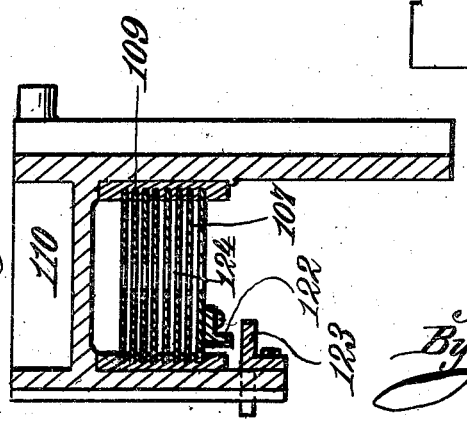
Witnesses.
Robert Courtlt.
Geo. W. Rea.
Inventor.
James McNamara
By James L. Norris
Atty.

No. 847,021. PATENTED MAR. 12, 1907.
J. McNAMARA.
MONOLINE COMPOSING MACHINE.
APPLICATION FILED JULY 14, 1905.
17 SHEETS—SHEET 16.
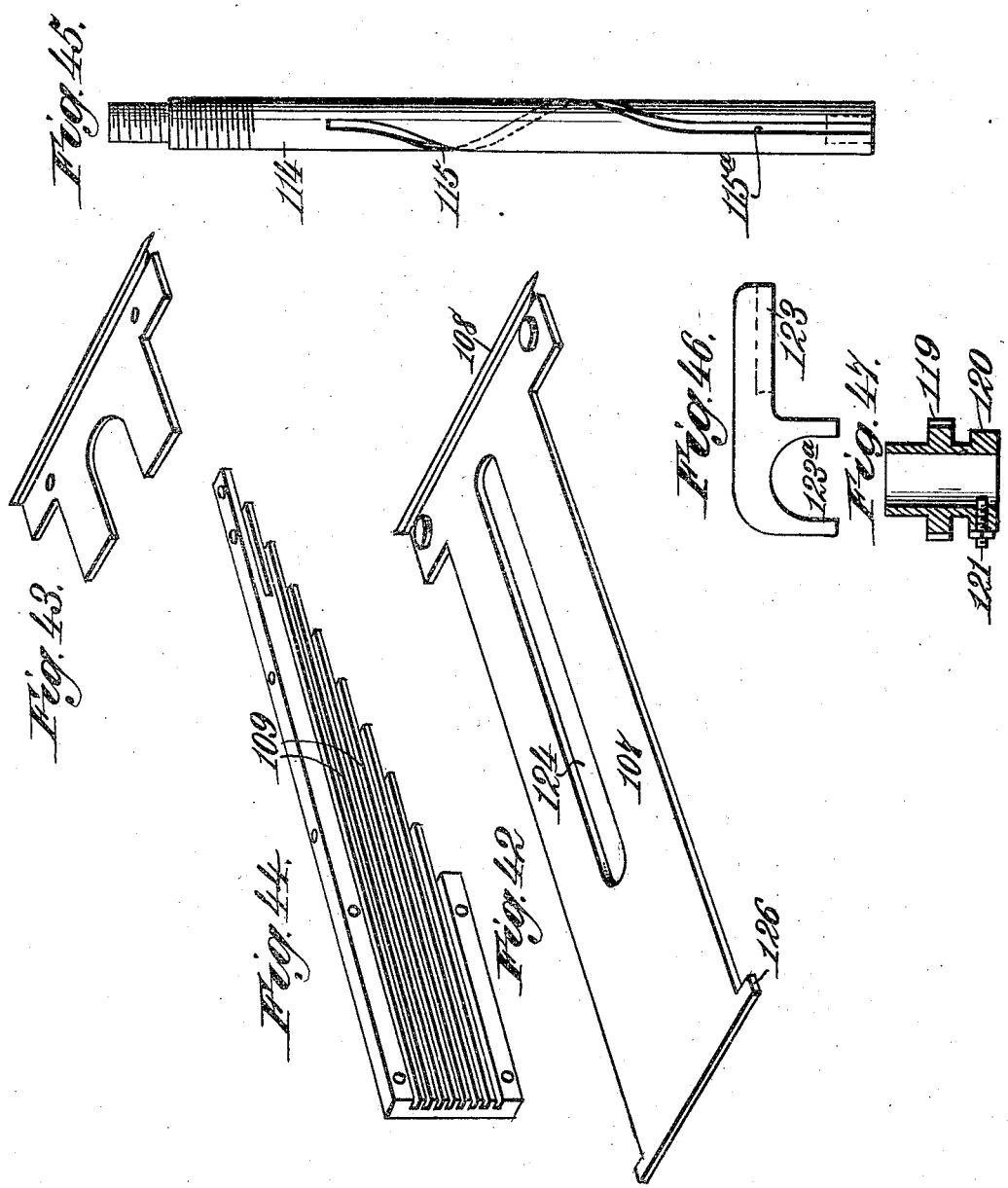

No. 847,021. PATENTED MAR. 12, 1907.
J. McNAMARA.
MONOLINE COMPOSING MACHINE.
APPLICATION FILED JULY 14, 1905.
17 SHEETS—SHEET 17.
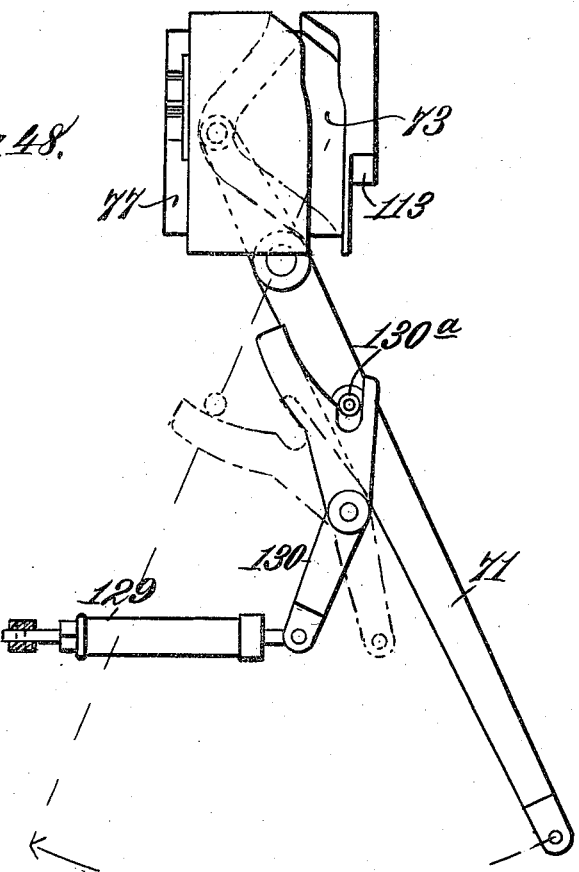
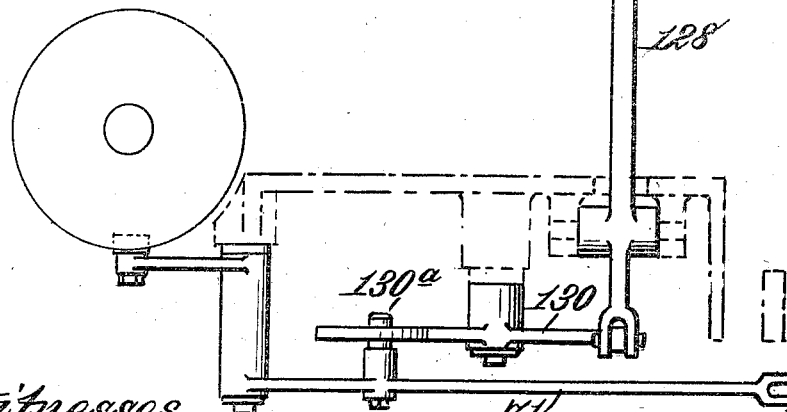
Witnesses.
Robert Evritt.
Geo. W. Rea.
Inventor,
James McNamara.
By James L. Norris.
Atty.

UNITED STATES PATENT OFFICE.

JAMES McNAMARA, OF MONTREAL, QUEBEC, CANADA, ASSIGNOR, BY MESNE ASSIGNMENTS, TO MERGENTHALER LINOTYPE COMPANY, OF NEW YORK, N. Y., A CORPORATION OF NEW YORK.

MONOLINE COMPOSING-MACHINE.

No. 847,021.      Specification of Letters Patent.      Patented March 12, 1907.

Application filed July 14, 1905. Serial No. 269,748.

*To all whom it may concern:*

Be it known that I, JAMES McNAMARA, a citizen of the United States of America, residing at Montreal, in the Province of Quebec and Dominion of Canada, have invented certain new and useful Improvements in Monoline Composing-Machines, of which the following is a specification.

My invention relates to improvements in monoline composing-machines, and has for its object to improve the construction and mode of operation of such machines, principally in respect of (a) the composing-box and the means for dealing with the matrix-bars in said box, (b) the line-carriage and the elements taking part in the transfer of the composed line of matrix bars and spacers to the mold in which a cast thereof is to be taken, (c) to improvements in and relating to the mold-carrier and trimming-knife wiper, and (d) to the distributing mechanism and means for operating the same.

The invention also relates to other improvements, which will be developed in the following description of a machine embodying my invention.

To the ends stated the invention consists in the new and improved means and arrangement of means and the mode of operation thereof hereinafter set forth and claimed. The several distinct improvements in means, arrangements, and mode of operation are such that one or more thereof may be used in the heretofore-known types of monoline-machines irrespective of the others, or all the features may be combined in a single machine.

That which I regard as new both as to the machine generally and as to the several novel elements and combinations and sub-combinations of elements will be set forth, generically and specifically, in the clauses of claims appended to the following description.

Figure 2:
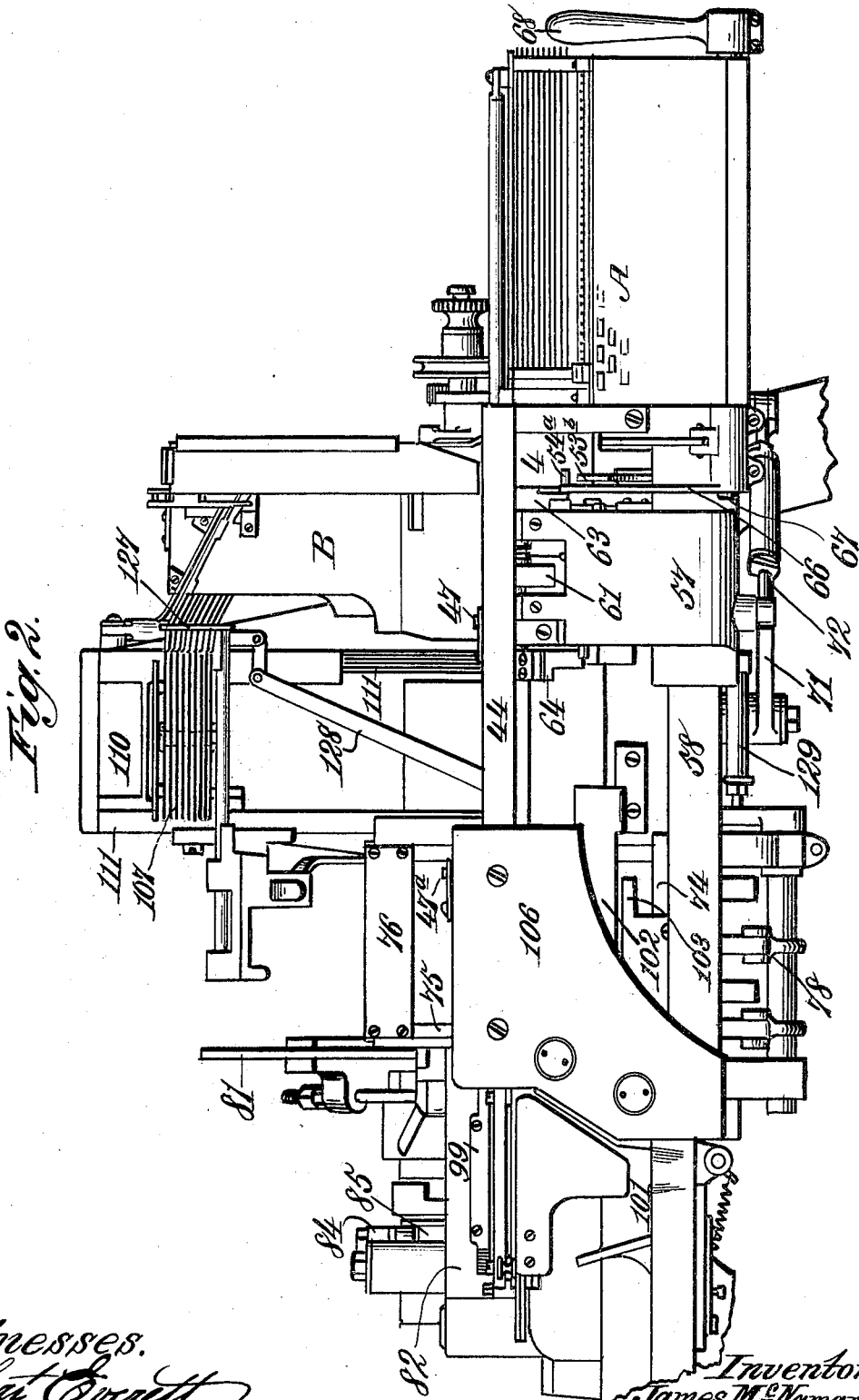
Figure 3:
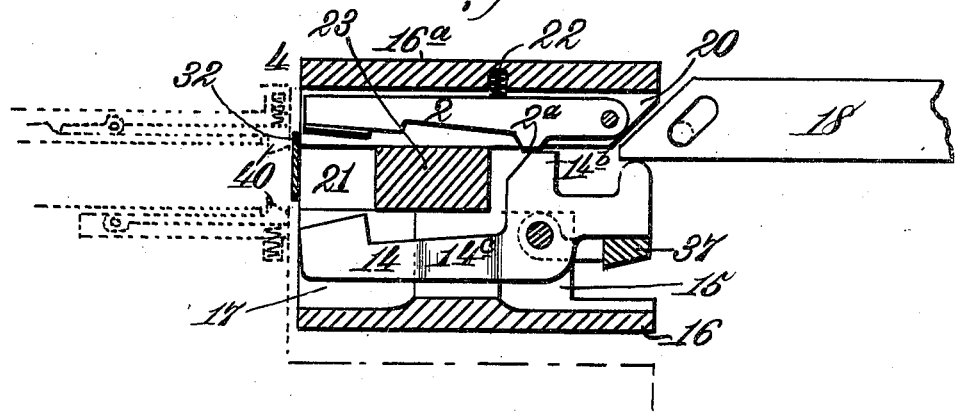
Figure 4:
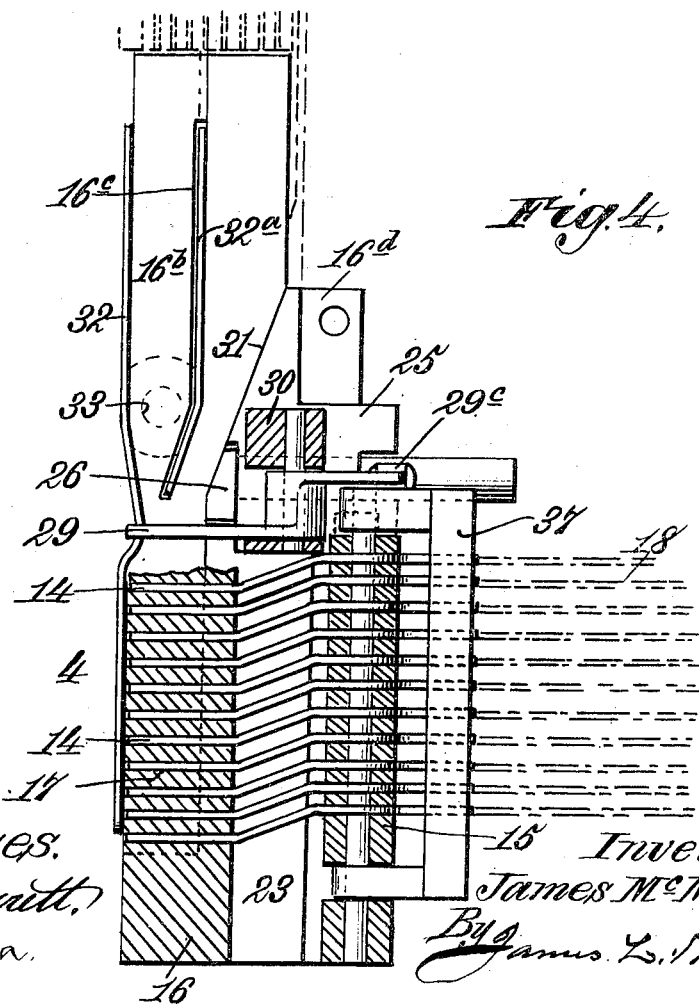
Figure 23:
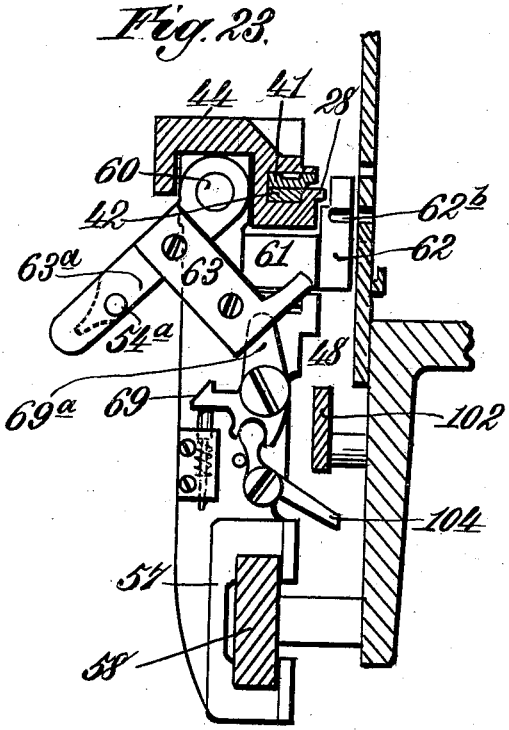
Figure 24:
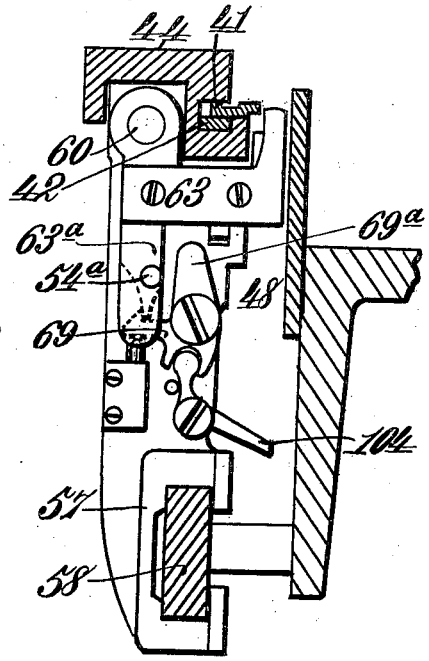
Figure 25:
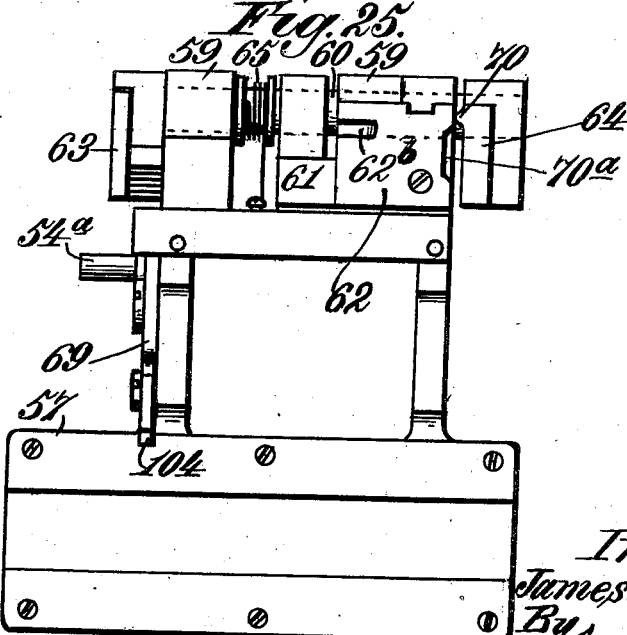

In the accompanying drawings, illustrating a machine embodying my invention, Figure 1 is a plan view. Fig. 2 is a front elevation. Fig. 3 is a horizontal sectional view taken through the composing-box and showing a matrix-bar arrester and a matrix-bar keeper and adjacent parts. Fig. 4 is a vertical longitudinal sectional view taken through the composing-box. Fig. 5 is a horizontal sectional view taken through the composing-box, illustrating the bridge on which the matrix-bars are supported in the composing-box and directed accurately onto the alining-bar outside of the composing-box and showing also in section the movable front and division walls of the composing-box. Fig. 5ª is a similar section with the matrix-ejector and supporting-bridge in operative positions. Fig. 6 is an elevation of the composing-box looking into the delivery end. Fig. 7 is a side elevation of a matrix-bar, showing the action of an arrester and a keeper. Fig. 8 is a perspective view of the rear side wall of the composing-box. Fig. 9 is a similar view of the front side thereof. Fig. 10 is a detail perspective of the post constituting the rear wall of the composing-box and the ejector-guide. Fig. 11 is a perspective view, disconnected, of the ejector, the matrix-bar bridge, and the bracket in which the latter is mounted. Fig. 12 is a perspective view of one of the matrix-bar keepers. Fig. 13 is a similar view of a matrix-bar arrester. Fig. 14 is a perspective view of the yoke for returning the matrix-bar-arrester slides to normal position. Fig. 15 is a side elevation showing the oscillator and connections therefrom for shifting the movable front and division walls of the composing-box. Fig. 16 is a top plan view of the same parts, illustrating also the initial position of the movable line-abutment. Fig. 17 is a detail of the cam arrangement for shifting the movable front and division walls of the composing-box. Fig. 18 is a detail of the pivoted gravity magazine-gate-actuating pawls. Fig. 19 is a perspective view showing the movable line-abutment and the means for throwing the same out of the line-race. Fig. 20 is a detail perspective view of the line moving and locking-up wings of the line-carriage. Fig. 21 is a top plan view illustrating the same parts. Fig. 22 is a perspective view showing the line-carriage. Fig. 23 is a view, partly in elevation and partly in cross-section, illustrating the means for maintaining the line-moving wing in operative position, the wing being shown as withdrawn from the line-race. Fig. 24 is a similar view showing the wing in operative position in the line-race. Fig. 25 is an elevation of the line-carriage looking against the inner or rear face. Fig. 26 is a detail view showing the pins for causing the movable alining-rail to enter and be withdrawn from the alining-recesses of the matrix-bars. Fig. 27 is a part sectional and part plan view illustrating the line-race and parts having to do with the action of the movable alining-rail. Fig. 28 is a perspective view of the movable alining-rail and the slide on which it is mounted, detached. Fig. 29 is a top plan view of these elements assembled. Fig. 30 is a detail elevation showing the connection of the fixed and movable alining-rails with a matrix-bar. Fig. 30$^a$ is an enlarged view of the parts shown in Fig. 30. Fig. 30$^b$ is a view showing the position of the assembly alining-rail with reference to the matrix-ejector. Fig. 31 is a view, partly in elevation and partly in section, illustrating the metal-pot, the mold, the anvil, the justifier, and depressor and means for operating the same. Fig. 32 is a detail fractional view showing the mold and the means by which it is connected to the mold-shifting lever. Fig. 33 is a detail perspective view of one end of the shifting-lever. Fig. 34 is a perspective view of the link connecting the mold with the shifting-lever and the knife-wiper carried thereby. Fig. 35 is a detail of one end of the mold. Fig. 36, Sheet 8, is a plan view showing the knife-wiper and the guard controlling the action thereof. Fig. 37 is a front elevation of the same parts. Fig. 38 is a side elevation of the distributer mechanism. Fig. 39 is a longitudinal vertical sectional view showing the arrangement of the lifting-plates. Fig. 40 is a cross sectional view on the line 40 40, Figs. 39 and 41, showing the manner of mounting said plates for movement in the elevator-frame. Fig. 41 is a top plan view of the parts shown in the two preceding figures. Fig. 42 is a perspective view of one of said distributer lifter-plates. Fig. 43 is a perspective view of the top lifter-plate. Fig. 44 is a perspective view of one of the guide-plates in which the lifting-plates move. Fig. 45 is an elevation of the post forming an element of the lifting-plate projecting and retracting mechanism. Fig. 46 is a plan view of the fork by which the plate projecting and retracting gear is supported. Fig. 47 is a sectional view of said plate projecting and retracting gear. Fig. 48 is a plan view showing the line-carriage-shifting lever and the connections for actuating the stripper-arm therefrom. Fig. 49 is a side view of the same parts. Fig. 50, Sheet 7, is a detail showing elements of the mechanism for automatically stopping the machine at the completion of each cycle of operation.

In said drawings the reference-letter A designates the finger-key mechanism, B the matrix-magazine, C the train of driving mechanism, D the metal-pot, and E the mold, all of which are or may be substantially like the corresponding elements in previous monoline-machines, shown, for example, in Letters Patent of Scudder, Nos. 506,198 and 605,141; Bertram, No. 622,989, and Bradley, No. 650,296.

For use in this machine the matrix-bars 1 (see Fig. 7 of the drawings) are of the general type heretofore commonly used in monoline-machines, with a series of characters in one edge and a corresponding series of alining notches or recesses in the opposite edge, but differing specifically therefrom in that they are provided with a supplemental recess 1$^a$, with which an appropriate keeper 2 coöperates to prevent rebound of the matrix-bar from the matrix-arrester, as will be hereinafter described. An adequate supply of such matrix-bars is stored in the magazine, matrix-bars having like characters being arranged in magazine-compartments appropriated thereto, as heretofore, and from which magazine they are selectively released by mechanism actuated from a keyboard, generally similar to the manner illustrated in the prior patents referred to, but improved in detail, as will appear.

The magazine-gates 3, Figs. 1 and 15, having for their function to bring the matrix-bars to discharge-point and discharge them into the composing-box 4, are arranged for operation in the manner shown in the Scudder patent, No. 605,141, and are acted upon by an oscillator 5 of the general type shown in said Letters Patent, in the details of which oscillator, however, I have made several material improvements. The oscillator is shown in Fig. 15 of the drawing, wherein a fragment of one of the magazine-gates 3 is shown in coöperative relation thereto. This oscillator, as heretofore, is provided with a scroll-cam 6, adapted to work against a continuously-rotating roller 7, whereby the cam is rotated and throws the upper end of the oscillator forward to impart return stroke to the magazine-gates, as heretofore. In the previous monoline-machines the oscillator was provided with a series of double-arm levers, to one arm of each of which a spring was attached to normally maintain the gate-engaging arms of said levers in proper position to engage the gates when the oscillator is rocked forward. According to my present invention I dispense with the double-arm levers and the springs, and thereby materially reduce the number of parts and simplify the construction and operation. This I accomplish by pivotally mounting at the upper end of the oscillator a series of gravity-pawls 8, one for each magazine-gate, the gate-engaging ends of these pawls being weighted, so that they normally by gravity assume a full-line position (shown in Fig. 18) and are then properly disposed for engaging and returning the gates to their forward position. These gravity-pawls when in this position engage the extremities of the gates, and on the forward movement of the oscillator to return the gates they maintain contact with these extremities, moving on their pivots to the position shown, for instance, in dotted lines in said figure of the drawing. Those pawls which are not in engagement with the gates maintain their normal full-line position and pass into the cutaway portions at the ends of the gates, as heretofore.

I have also provided means for adjusting the oscillator with relation to the magazine-gates, whereby the exact throw necessary to return the gates fully to their forward position, in which position they support matrix-bars ready to discharge the same into the composing-box, is obtained. This adjustment is chiefly desirable in the initial setting of the machine. I accomplish it in the example of this part of my invention shown in the drawings by setting the shaft 9, which carries the continuously-rotating cam-operating roller 7, in an eccentric sleeve 10, arranged in the shaft-bearing 11, and providing means, such as a head $10^a$, exposed for manipulation and having means, such as recesses $10^b$, whereby said ring and the eccentric connected therewith may be rotated with facility to set the cam-operating roller nearer to or farther from the cam, as may be necessary. It will be apparent that when the cam-operating roller is set close to the scroll-cam a greater throw will be imparted to the oscillator than when said cam-operating roller is further removed from the cam. By the means shown the throw of the oscillator can be adjusted with nicety to give just the required return stroke to the gates.

*Composing-box.*—The matrix-bars when released from the magazine are discharged downwardly into a composing-box 4, which box and the means for dealing with the matrix-bars therein are shown in Figs. 3 to 14 of the drawings. The several matrix-bars descending from the magazine are arrested at predetermined elevations, according to the matrix character thereon of which a cast is to be made, whereby the selected characters appearing on a series of such bars will be disposed in a common line by means materially differing from those heretofore employed. Such means consists of a vertical series of horizontally-movable arresters 14, pivoted between distance-blocks 15, projecting from the face of a plate 16, constituting one side wall of the composing-box. The active ends $14^a$ of these arresters work in guide-grooves 17, with which the plate 16 is provided, and are normally retracted within said grooves and out of the path of drop of the matrix-bars. The arresters are actuated to project their ends $14^a$ into position to arrest the fall of the matrix-bar by means of a series of slides 18, which receive motion from the finger-keys, one slide being appropriated to each arrester. These slides, as best shown in Fig. 3, work against the tail ends of the arresters in a direction to throw the active ends of the latter into operative position. Operatively coupled to or associated with the series of matrix-bar arresters is a series of yielding fingers 2, which constitute the matrix-bar keepers before referred to. These fingers are pivotally mounted at one end in channels 19 in a plate $16^a$, constituting the other side wall of the composing-box. The keeper-fingers are normally housed within the channels out of the way of the falling matrix-bars by the corresponding arresters 14, which for this purpose are provided, as shown in Fig. 3, with lugs $14^b$, that engage cams $2^a$, with which the fingers 2 are provided. When a given matrix-bar arrester 14 is projected into the composing-box to arrest a descending matrix, the corresponding keeper 2 will also be projected into the box in such manner as to engage in the supplemental recess $1^a$ of the matrix-bar, as shown in Fig. 7, to prevent the bar from rebounding. To this end the lug $14^b$ and cam $2^a$ are so arranged that the former rides off the latter as the tail end of the arrester swings away under the influence of the corresponding slide 18, whereupon the finger 2 will be acted on by a suitable element, such as a spring 22 bearing thereagainst, and have its free end projected slightly into the drop-space 21. When a finger-key is operated, a slide 18 is actuated and a corresponding matrix-bar arrester and keeper assume their operative positions, the arrester being beneath the matrix-bar and the keeper in engagement with a supplemental recess $1^a$ of said bar, as shown in Fig. 7. Necessarily, therefore, the active parts of these elements must be arranged at different elevations in the composing-box, and to provide for this the forward ends of the matrix-bar arresters are dropped, as best shown at $14^c$ in Figs. 4 and 13.

It has been found desirable to provide some means from preventing the possible rebound of the matrix-bars above referred to, and heretofore this has been accomplished by a fixed spring-actuated pawl, over which the matrix-bars were compelled to pass, whereby a considerable retardation of the fall of matrix-bars was occasioned with a consequent diminution in speed of operation of the machine. The present arrangement possesses material advantages over the prior one in that in all cases by reason of the fact that there is associated with each matrix-bar arrester a corresponding keeper-finger which is normally withdrawn from the matrix-bar drop-space, but is projected thereinto simultaneously, or substantially so, with the matrix-bar arrester; and, irrespective of the point at which the matrix-bar is arrested, but one projection will have to pass the keeper-finger. When the matrix-bar arrester is withdrawn, the corresponding keeper-finger is also withdrawn by the action of the lug $14^b$ on the cam $2^a$. The rear wall of the matrix-bar box or composing-space 21 is formed (see Fig. 10) by a post 23, having a forwardly-extending base 24, which closes the lower end of said space. Connected to the upper end of this post is a guide-block 25, provided with a keyhole-slot $25^a$, in which an ejector 26, Figs. 4 and 11, is arranged to reciprocate horizontally, the function of which ejector is to move the matrix-bars laterally toward the left from the composing-box onto a fixed alining-rail 28. (Shown in Figs. $5^a$, 23, $30^b$, &c.) The ejector is provided with a web $26^a$ working between the parallel walls of the keyhole-slot, whereby axial movement thereof is avoided. The ejector is operated by means of a bell-crank lever 27, Fig. 5, and connections such as shown in the Scudder patent, No. 605,141.

The slides 18 are retracted and the matrix-bar arresters withdrawn by means of a yoke 37, Figs. 3, 4, and 14, which is mounted upon the pivot upon which the matrix-bar arresters are arranged, as best shown in Fig. 4. This yoke is connected to a slide-bar 38, Fig. 5, operated from the oscillator in the manner shown in the Scudder patent, No. 605141.

The assembly alining-rail 28 for alining the matrices cannot well, it is obvious, project into the matrix-drop or composing-space, as it would interfere with the fall of the matrix-bars. By my invention I provide means whereby the matrix-bars are guided onto this alining-rail when moved out of the composing-box by the ejector. This means is arranged within the composing-box and consists of a bridge 29, Figs. 4, 5, 6, and 11 pivoted in a bracket 30, secured to one wall of the composing-box. The forward end of this bridge is arranged to form a movable continuation into the composing-box of the alining-rail 28 and is arranged to be moved into engagement with the alining-recesses in one edge of the matrix-bars opposite the characters selected for casting, and the matrix-bars move upon this bridge and are directed accurately onto the alining-rail by the ejector 26. The bridge is normally retracted or withdrawn from operative position by means of a spring $29^a$ operating upon the tail end thereof, as best shown in Fig. 5 of the drawing. It is thrown into operative position in engagement with an assembled line of matrix-bars by the ejector when the latter begins its ejecting stroke. This is accomplished in the present example of my invention by means of a cam-lug $29^b$ fitting into a cam-recess $29^c$ in the ejector, whereby on the forward or active stroke of the ejector to advance the matrix laterally toward the line the bridge is swung and its forward end projected into the matrix-bar drop-space 21 and into engagement with the alining-recesses coinciding with the selected characters of said bars, and the extremity of said bridge comes into substantial continuity with the end of the alining-rail 28, as shown in Fig. $5^a$, &c.

In the continued movement of the ejector the matrix-bars ride along the bridge and onto the alining-rail. By the use of the bridge, movable edgewise in relation to the matrices and in alinement with the rail 28, the matrices are given a continuous support from the time they are arrested in their descent, and the one alining-recess in each matrix is utilized in sustaining the matrix both inside and outside of the composing-box. It is to be noted that this arrangement avoids the necessity of providing each matrix with a series of holes to receive a reciprocating sustaining-pin used in an earlier machine. As each matrix-bar is discharged from the magazine and arrested in proper position in the composing-box the ejector moves forward, carries the bar along the bridge and onto the alining-rail. The ejector is then retracted by means of the connection hereinbefore referred to, and when it has assumed its initial position the cam-lug $29^b$ enters the recess $29^c$ under the impulse of the spring $29^a$, withdrawing the bridge out of the space 21. It is to be noted that each matrix descending into the box is arrested, and at practically the same instant the bridge advances sidewise into the box and into the edge of the matrix until the end of the bridge alines with the end of the fixed rail 28, so that a continuous support is provided for the matrix before the ejector acts horizontally thereon. Owing to the fact that the bridge engages edgewise of the matrix, it is without tendency to throw the same out of position or to cause its premature advance toward the line. In other words, the bridge and the fixed rail joining end to end form a continuous horizontal support on which the edge of the matrix may travel from the point at which it is arrested to the end of the composed line as it is carried forward by the ejector 26.

The matrix-bars in falling into the space 21 are guided in their flight at the rear or right-hand side by a wall 31, Figs. 4 and 5, the inclined lower end of which is made up of the beveled front faces of the ejector 26 and guide-block 25, Figs. 4 and 10, in which said ejector moves. The inclined lower portion of this wall directs the matrix-bars to proper assembly-position.

It is obvious that in order to properly guide the matrix-bars and prevent their falling over sidewise to the left a front support is necessary, and yet a passage must be provided to permit the matrix-bars to be ejected from the composing-box onto the alining-rail. According to my invention this front guide, or, as it is termed, "front wall," of the composing-box is movable into and out of the box on the left side when the box is viewed from the front for the purposes mentioned. I find it also desirable to provide a division or partition in the space through which the matrix-bars fall, so as to prevent possibility of their tilting and becoming wedged in the space. Accordingly I provide, as shown in Figs. 4, 5, 6, 15, and 16, a front wall 32 and a division-plate 32ª and means for moving the same forward and backward into and out of the composing-box. The said wall and plate are connected to a rod 33, as best shown in Figs. 15 and 16, which rod is loosely connected by a link 34 to a scroll-cam 35, (see Fig. 17,) mounted on the shaft 9, which operates at the proper time to retract the wall 32 and division-plate 32ª and permit ejection of the matrix-bars. Said wall and plate are returned into the composing-box by means of a spring 36, associated with the rod 33.

The rear wall of the composing-box is provided with a slit corresponding to the shape of the division-plate 32ª to permit of the described movement of said partition. For convenience of manufacture this side wall at its upper portion is made in two parts 16ᵈ and 16ᵇ, bolted together, one of said parts being cut away, as shown at 16ᶜ, whereby the slit is formed.

In detail construction the composing-box for convenience of manufacture is made up of two side walls and the rear wall in separate and distinct pieces suitably connected together, as by means of bolts, whereby machining of these parts is very much facilitated and economized.

*Line formation and transferring mechanism.*—As each matrix-bar is ejected laterally toward the left from the composing-box it passes between yielding detents 40 onto the fixed horizontal assembly-rail 28. (Shown in Figs. 3, 27, and 30.) These detents are shown in the form of pivoted levers having beveled noses projecting into the line-race, into which race they are normally held by means of suitable springs, as best shown in dotted lines in Fig. 3. The detents yield readily to permit the passage of the matrix-bars, immediately after which they snap back into place and prevent the bars from moving or tilting backward toward the right.

During the composition of a line spaces are introduced into the line in a previously-known manner, and since my invention does not concern the spaces or the means for introducing the same into the line they are not described.

The fixed assembly-rail 28, onto which the matrix-bars are strung and along which they move during the composition of the line, is so arranged that it will enter the alining-recesses in the matrix-bars part way or to part of their depth only, as best shown in Fig. 30. This particular relative arrangement of the assembly-bar is advantageous in that the projections separating the alining-recesses of the matrix-bars in riding along the same during the composition of the line become more or less worn off after continued use. The wearing away of these projections widens the alining-recesses and in course of time may detract from the desired perfect nature of the alinement; but by so arranging this rail that it enters but part way into the alining-recesses the wear upon the projections referred to is upon the outer portions thereof only, the inner portions, which are not engaged by the rail, remaining of original width. Therefore a machine embodying, according to my invention, in addition to the fixed horizontal assembly-rail 28 (shown in Figs. 5ª, 23, 30ᵇ, &c.) a traveling alining-rail 41, which moves with the line-carrier from the composing to casting position, the greatest degree of accuracy of alinement is attained, because, as will be obvious from the description next following, the traveling alining-rail will enter to the full depth of the alining-recesses of the matrix-bars, as shown in Fig. 30 of the drawings, thus entering the unworn portions of the deeper alining-recesses, rather than the portions which may have become worn, will coöperate with such traveling alining-rail.

The traveling alining-rail 28 (shown in Figs. 5ª, 23, 30ᵇ, &c.) is provided with a longitudinal channel 41ª and is mounted upon a slide 42, arranged in a race 43 in a front bar 44 of the machine. This slide is provided with pins 45, that enter cam-slots 46 in the alining-rail 41. The parts are clearly shown detached in Fig. 28 and assembled in Fig. 29. The arrangement described is such that the traveling alining-rail has a twofold movement—that is to say, into and out of the alining-recesses of the matrix-bars—and also a traveling movement with the line-carriage, with which it is connected by an arm 41ᶜ. The in-and-out movement, or, in other words, the edgewise movement, of the traveling alining-bar is effected by spring-pins 47 and 47ª. The pin 47 acts to project the rail into engagement with the matrix-bars and the pin 47ª to withdraw the same therefrom. Said pins are interposed in the path of travel of the alining-rail. When the line-carriage starts to move, the rail comes against the pin 47, and its movement is stopped thereby, and the rail is compelled positively to move rearwardly on the pins 45 of the slide 42 into engagement with the alining-recesses of the matrix-bars. When it has been so moved edgewise into such engagement, the alining-rail is clear of the pin 47 and passes in front of it. When the alining-rail meets the pin 47ª, it engages the beveled nose of said pin and lifts the latter out of the way and passes unacted upon by said pin until the forward portion of the alining-rail passes in front of the shoe 41ᵇ, Fig. 27, which acts as an abutment during the face alinement and casting operations hereinafter referred to.

Projecting into the line-race 48, as shown in Fig. 5ª and elsewhere, is a movable abutment 49 for one end of the line being composed, against which the line during composition is pressed. This abutment, as shown, consists of the head 49, having two fingers 50, which extend into the line-race, and connected to the head is a spring-piston 51, the barrel 52 of which is suitably pivoted at one end to the machine-frame, whereby the said fingers are capable of swinging rearwardly out of the line-race to permit the passage of a line after composition thereof. The line as it is being composed is supported at one end by the detents 40 and at its opposite end by said yielding fingers.

The fingers 50 are provided with recesses 50ª, or, in other words, the ends of the fingers 50ª project forwardly, so that in the initial stage of line composition they reach forward close to the composing-box, as best shown in Fig. 27, to provide an abutment or bearing for even the first matrix as it is ejected from said composing-box, supporting the same and preventing possibility of tilting thereof. The fingers 50 offer a yielding resistance to the line in course of composition as its forward end is advanced by the addition of matrices at the rear end. When a predetermined line length of matrix-bars has been composed and the line-carriage is about to be shifted to casting position, said fingers are swung out of the line-race by means of an arm 53, Fig. 19, one member 53ª, Fig. 19, of which engages the rod of the piston 51 and the other member 53ᵇ of which is acted upon by a pin 54ª on the line-moving wing of the line-carriage, hereinafter referred to. When so removed from the line-race, it is acted upon immediately and while still held out by the member 53ª of the arm 53 and pulled back toward the right to initial position by the spring-piston 51, whereupon the fingers are introduced into the line-race by means of a spring-actuated pusher 56. (Illustrated in Figs. 19 and 27.)

The line-carriage of my invention is shown in Figs. 2, 22, and 25 materially different from and much simplified and of increased efficiency as compared with the line-carriages shown in previous monoline patents. The line-carriage is composed of a base 57, fitted to run on a rail 58, and a superstructure comprising uprights 59, in which is mounted a shaft 60, on which shaft is arranged a bracket 61, to which is connected a head-block 62, the position of which head-block and the dimensions thereof determines the length of line to be composed. The head-block is connected to the bracket in a readily-detachable manner, so that it may be removed and another of longer or shorter length, to provide for the composition of a longer or shorter line, substituted therefor. The bracket 61 and the head-block carried thereby are capable of slight movement for the purpose hereinafter set forth. In the head-block is provided a recess 62ᵇ to receive one of the fingers 50 of the movable line abutment, to the end that said fingers may move out to the full length of the line to be composed.

Upon the shaft 60, at opposite ends thereof, as shown in Figs. 1, 2, 22, 23, 24, and 25, are secured a line-moving wing 63 and a line-lockup arm 64. (See Figs. 20, 21, 22, and 25.) During the composition of the line these elements are swung forward out of the way by a suitable spring 65, connected to the shaft 60, as shown in Fig. 25. When the line has been composed, said elements are swung into operative line-carrying position manually by the operator, so as to embrace the line between them through the medium of an arm 66 on a shaft 67, actuated by the starting-lever 68, as shown in Figs. 1 and 2, and are locked in such position during the travel of the line-carriage by a catch 69, Figs. 23 and 24, engaging the wing 63. These parts in arrangement and mode of action resemble those shown in Patents Nos. 506,198 and 605,141. In the act of swinging the wing 63 and arm 64 into operative or line-carrying position the head-block is moved to lock up the line of matrix-bars by means of a pusher 70, provided on the arm 64, which when the arm 64 is swung into operative position engages the head-block and presses the latter closely onto the line of matrix-bars. (Shown in Fig. 25.) The head-block is provided with a recess 70ª for a purpose which is hereinafter described. With the parts in this position, the matrix-bars strung upon the assembly-rail and locked up in the carriage, the latter is moved to justifying and casting position by a lever 71, Figs. 48 and 49, operated from a cam-race 73, substantially in the manner disclosed in previous patents relating to the monoline-machines. The traveling alining-rail is positioned in such relation to the fixed assembly-rail that during the travel of the line-carriage said alining-rail is moved slightly over the fixed assembly-rail and is carried into the notches or recesses in the matrix-bars, the latter being caused, in the manner stated, to ride off of the fixed assembly alining-rail, after which they are supported by the traveling rail. The action of the traveling alining-bar is rendered positive and certain by the means hereinbefore described, said rail first coming into contact with the pin 47, Figs. 26 and 27, which stops its onward movement and compels it to be projected positively and certainly into the alining-recesses of the matrix-bars by reason of the elongated cam-slots and the pins on the slide-bar engaging with said slots. When this traveling alining-rail has been fully seated in the alining-recesses of the matrix-bars, it passes out of coincidence with said pin and is then capable of partaking of the continued travel of the carriage. In the transit to the justifying and casting position the traveling alining-rail meets the beveled nose of the spring-pin 47ª and lifts said pin out of the way, as described. It is convenient now, before describing the justifying and casting operations, to set forth the action of the traveling alining-bar when the carriage is returned to receive a new line. On the return movement said traveling alining-rail impinges against the said pin 47ª, which obstructs its travel and compels said traveling alining-bar to move back on the pins 45, positively withdrawing said rail edgewise from engagement with the matrix-bars, leaving the latter in condition to be taken care of by the distributing mechanism, hereinafter referred to. In this position the channel 41ª is in line with the pin 47ª and the latter enters the channel, permitting the rail to pass. After the matrix-bars have been withdrawn the carriage proceeds to initial position to receive a new line and in passing engages the beveled nose of the pin 47, lifts the latter out of its way, and proceeds beneath the same.

*Justifying and casting mechanism.*—The mechanism for justifying the lines and casting a monoline therefrom is of substantially the known type, and since my invention does not concern these mechanisms a general reference thereto, sufficient to make plain the coaction of said devices with the other parts of the machine, is all that will be necessary. The justifier consists of a shoe 74, forming part of a vertically-reciprocating frame 75 and operating beneath the line of matrix-bars. A corresponding arm or bar 76 at the upper end of the frame acts as a line-depressor, as will be hereinafter set forth. The justifying mechanism is operated from a suitably-shaped cam 77 on the line or cam-shaft through the medium of connected links and levers 78. The cam 77 is shaped to permit of the justification being accomplished by a series of taps or pushes upwardly upon the spacers (not shown) by the shoe 74, substantially in the manner heretofore known. This plurality of taps or pushes may or may not be employed, as may be desired.

The melting-pot D may be of any known type. As shown in Figs. 1, 3, &c., it is mounted to be reciprocated to and from the mold and is arranged to accomplish face adjustment of the matrix-bars, being connected up with a cam 80, which forces it forward to bring the mold firmly against the character-faces of the matrix-bars and secure proper face alinement preparatory to casting. If desired, and as shown, the cam 80 may be so formed and timed with relation to the action of the metal-ejecting plunger that the face-alining operation of the pot may be repeated before the casting operation takes place. This has been found desirable for certainty of face alinement, but is not essential to my invention; nor, indeed, is it essential to my invention that the pot shall be capable of any alining action. After the justification of the line has been completed the pot is advanced, bringing the mold into proper position in front of the character-matrices of the matrix-bars. The metal-ejecting plunger 81 is now actuated and the cast taken in the usual manner. The mold shown is generally of the type heretofore known; but I have improved the same, particularly with relation to the manner of its connection to the mold-shifting devices, whereby it may be quickly and with great facility detached therefrom and substituted by a different mold, as occasion often demands—for instance, when monolines of different length are to be cast, the mold necessarily, of course, having to be of dimensions corresponding to the length of monoline desired.

My improvements in respect of the mold are best shown in Figs. 32 to 35, wherein the reference-numeral 82 designates the mold-frame in which the mold E is movably arranged, so that it may be reciprocated to take it from casting position to the point where the monoline is ejected therefrom, as usual. This reciprocating movement may be accomplished in any desirable manner, that shown being by way of a lever 84, Fig. 1, one end of which works in a cam 85 on the cam-shaft, and a link 86, connecting said lever with the mold. This link is provided with a pin 87 at one end, fitted in a socket 88 in the mold, and, as shown, at its other end is provided with an opening 89, which receives a stud 90 on the lever. The engagement of the link with the mold and the lever is secured or locked in a manner which permits of its disconnection with ease and facility. The securing or locking means shown consists of a button 91, pivotally arranged on the lever and capable of being turned to overlie or cover that end of the link which is connected to the lever by means of the lug and opening referred to. The button is secured to the lever by means of a screw 92, interposed between the head of which and the button is a spring-washer 93, that holds the button firmly in contact with the end of the link and at the same time permits it to be readily turned to the position shown in Fig. 33 to permit the link to be easily and quickly disengaged. The connection between the other end of the link and the mold is maintained by an overhanging ledge 94 on the mold, providing a recess 95, into which the end of the link passes when the parts are in normal operative position, as shown in Fig. 32, in which position the pin 87 cannot pass out of the socket 88. When the mold is to be moved, however, and the link has been disconnected from the lever in the manner described, said link may be readily turned to the position shown in Fig. 34 with relation to the mold shown in Fig. 35, in which position the end of the link passes out from beneath the overhanging ledge, the end of the link having a portion cut away, as shown at 96, for this purpose. When the link is in this position with relation to the mold, the pin may be lifted out of the socket. I mount the knife wiper or cleaner 97 directly on the link 86 in the illustrated example of my invention. This wiper, consisting simply of a body-plate with a transverse lip secured to one end, as shown in Figs. 32 and 34, or formed integral therewith, is pivoted to the link and is spring-pressed, as shown at 98 in Fig. 32. In order that the particles cleaned from the knife will be swept outward toward the end of the machine, as is desirable, I interpose a guide 99, Figs. 36 and 37, in the path of movement of a lug 97ª on the wiper when the mold is returning to casting position, which guide engages the wiper and moves it against the tension of the spring 98 away from the line of contact with the knife. At the end of the sweep of the mold the wiper passes out of engagement with the guide and is swung in front thereof by said spring, whereby on the return movement it engages and cleans the knife. I believe the present to be the first instance in which a reciprocating knife-wiper has been moved along the knives in one direction in contact therewith or in close proximity thereto and then returned in the opposite direction at a distance from the knives, and it is manifest that the details of construction may be variously modified without passing beyond the limits of my invention. When the mold is shifted to ejecting position, the monoline is ejected therefrom by an ejector 100 into a galley 101, which elements and the operation thereof may, as shown, be of the type shown in the patents before referred to.

*Matrix-bar distribution and connected mechanism.*—After a cast has been made, the first step initiatory to the distribution of the matrix-bar is the depression of the matrix bars and spacers in the line to bring them to a common level, so that the hooks on the upper ends thereof will be in exact position to string themselves laterally with certainty on the lifter-plates of the distributing mechanism. The depressor 76, hereinbefore referred to, moves down and engages the matrix bars and spacers, bringing them all to a common level with their bottoms resting on the supporting-rail 102. (Best shown in Fig. 31.) During the downward movement of the depressor, but before the same has engaged the matrix bars and spacers, the trip 103, with which the justifying-shoe is provided, comes into engagement with the trigger 104 of the line-lock up mechanism and releases the lock up-arm 63 from the catch 69 and swings the throw-out finger 69ª against leg 63ª of arm 63 and imparts a partial swing to said lock up-arm and the line-moving wing 64 sufficient only to permit a pusher 70, carried by said wing, to enter the recess 70ª in the head-block 62, relieving the pressure of the head-block upon the line and allowing the latter to assume a loose condition in the carriage to facilitate the removal of the matrix bars and spacers therefrom. The movement of the lock up-arm is limited at this point by coming in contact with a stop-rail 105, arranged on the inner wall of the anvil 106. I prefer to provide a distinct stop projecting from the anvil-wall. It is obvious, however, that the wall of the anvil itself may be made to serve efficiently as such stop. Loosening up of the line at this point is desirable, so that the lifter-plates 107 of the distributing mechanism may lift the matrix-bars from the carriage with ease.

The distributing mechanism, with its vertically and horizontally movable lifter-plates, is of the same general character as that represented in United States patent to Bradley, No. 650,296. Entire withdrawal of the arm 64 and wing 63 from their operative relation to the line would be impractical, as there would then be no end support for the line of matrix-bars, and there would be extreme liability of such bars tilting over sidewise and falling out of the carriage; but by providing for a partial movement only, sufficient to enable the pusher to enter the recess in the head-block, the engagement of the arm and wing with the line of matrix-bars is relieved and the latter assume the desirable loose condition. At this time the lifter or elevator-plates 107 will have assumed a position with their hook-stringers 108 in vertical alinement over the line-race, and as the carriage moves back to receive a new line the matrix bars and spacers string themselves upon said stringers as in prior machines. I have materially improved the means for operating the lifters or elevators, lessening the work required to be done by the machine and imparting the requisite movements to said elevators with certainty.

The lifter-plates are movably arranged in horizontal guideways 109, formed in the sides of an elevator 110, moving between uprights 111, and with which is connected a lever 112, engaging a cam 113 on the cam-shaft, the arrangement shown being such that the elevator and the plates carried therein move to lowered position to receive the matrix bars and spacers by gravity and are lifted positively by the cam. It is obvious, however, that the cam may be so formed and the lever so connected therewith that the movement in both directions will be positive.

Located adjacent the elevator, as best shown in Figs. 38 and 44 and in detail in Fig. 45, is a post 114, provided with a groove 115, spirally arranged and once encompassing the circumference of the post, the lower extremity or leg 115ª of the groove, as distinctly illustrated in Fig. 45, running vertically in a direction parallel to the intended line of movement of the elevator. The particular conformation of the groove, in part spiral and in part parallel with the movement of the elevator, is for the accomplishment of distinct functional offices, as will hereinafter appear. The post, as shown is mounted at its lower end in a step-bearing 116 and at its upper end is fixed in the eye of a bracket 117, secured to the uprights in which the elevator moves, and in which eye the post is adjustable for a purpose to be referred to by means of nuts 118 upon the screw-threaded upper end of the post. A gear 119, which partakes of the up-and-down movement of the elevator-plates, is mounted upon the post, and combined therewith is means whereby in the up-and-down travel of the gear it is caused to have also a rotary motion. This means, as shown in Figs. 38 and 47, consists of a ring 120, formed or constructed integrally with the gear 119 and provided with means, such as a pin 121, projecting into the groove of the post. To the lowermost of the elevator-plates is secured a longitudinal rack 122 in mesh with the gear. The gear is caused to partake of the up-and-down movement of the elevator in a suitable manner, that shown being by means of a bracket 123, Figs. 38 and 46, secured to the elevator, which has a forked end 123$^a$ straddling the gear-hub between the gear and ring, whereby when the elevator moves down the gear-wheel moves down also and when the elevator moves up the gear-wheel takes the same movement. During the up-and-down movement of the elevator and gear, as described, the latter is caused to rotate by reason, in the example of my invention shown in the drawing, of the pin operatively connected with said gear and working in the spiral groove in the post.

The several plates of the elevator mechanism are provided with slots 124 of varying length, as shown in Figs. 39, 40, and 42, through which slots a plate-propelling and retracting arm 125, connected to the lowermost plate, passes. In the elevated position of the plates, as best shown in Fig. 39, the hook-stringers 108 thereof are laterally separated and in coincidence or alinement with the matrix-bar hangers disposed in the several magazine-cells, whereby the said stringers form practical continuation of said hangers, so that the matrices may be transferred laterally along stringers 108 of the plates into the respective cells of the magazine. In the downward travel of the elevator-plates the gear-wheel is caused to rotate, as described, projecting the lowermost plate, and with it the plate projecting and retracting arm, which comes first into engagement with the end of the wall of the slot in the next adjacent elevator-plate, and then with the ends of the walls of the slots in the other plates successively until at the time the means by which the gear-wheel is rotated enters the vertical leg of the groove in the post the elevator-plates will have assumed a position in which the stringers 108 will be in vertical alinement, and thereafter during the descent of the elevator said plates will move in a straight line with their stringers in such alinement until they are in position over the raceway to enable the hooks of the matrix-bars and spacers to pass laterally onto the same.

To prevent possibility of any plate by reason of momentum being projected farther than is designed, the rear ends of the plates are formed with stops consisting, as shown, of laterally-projecting extensions 126, which come into engagement with the side bars of the elevator 110. On the return or upward movement of the elevator a reverse motion is obtained—that is to say, initially—by reason of the fact that the pin 121 is moving in the vertical portion 115$^a$ of the groove in the post. The gear 119 will not be rotated, and therefore the matrix-bar-lifting plates will move in a direct vertical path a sufficient distance to lift the matrix-bars and spacers directly vertically out of the line-carriage until the lower ends thereof are free from the framing of the carriage, and when this position has been assumed the gear-directing pin 121 will enter the spiral portion of the groove and cause the gear to rotate and positively withdraw through the rack 122 as the elevator moves upward the lowermost lifting-plate. This plate, through the medium of the retracting-arm connected thereto, which engages in succession the rear walls of the slots in the respective plates, withdraws them from the vertical alinement which they had in their lowered position to the position hereinbefore described and in which the stringers thereof are disposed laterally out of line with each other and in coincidence with the respective hangers of the magazine-cells. In this sequence of action the stringers 108 of the lifter-plates will describe first for a short distance a vertical movement until the matrix-bars are clear of the carriage. Then they will travel backward until when they come to rest in an elevated position they will, as before stated, be in coincidence with the hanger elements of the magazine-cells, as shown in Figs. 1, 2, and 38. The adjustment of the post 114 referred to is for the purpose of accurately setting the same with relation to the lifter-plates to secure the exact degree of movement thereof. Such adjustment disposes the pin 121 at the proper point in the groove of the post to impart the proper degree of rotation to the gear, and whereby the movement of the lifter-plates is controlled. The carriage, after the matrix bars and spacers have been removed therefrom by the elevating mechanism referred to, returns to initial position to receive a new line, the line-moving wing and the lock-up arm being by the throw-out spring 65 during the travel of the carriage completely withdrawn from the raceway. When the carriage has returned to its initial line-receiving position, the line-abutment fingers 50 will have reëntered the raceway in position to support the first matrix introduced into the line-race and the succeeding matrix bars and spacers that go to make up a line. When said abutment-fingers are in initial position, the ends thereof project close to the composing-box, as before referred to. Frequently—as, for instance, when trying or cleaning the machine—it is not desired to set up a line, and in such cases the fingers must be withdrawn from the line-race, and to do this the fingers must be moved forwardly to clear their ends from the composing-box. This is accomplished (see Fig. 16) by providing the stop 55 with a cam-bevel 55$^a$, that works against the fingers and on which they ride when pushed in a direction to force them out of the line-race, imparting a forward movement to the fingers sufficient to clear them.

When the elevator-plates have lifted the matrix bars and spacers into distributing position, (shown in Fig. 38 of the drawing,) a stripper-plate 127, Figs. 2 and 38, comes into operation, engaging the several matrix bars and spacers, pushing them off from the plates onto the hangers appropriate to the several magazine-cells. This stripper is in the form of a plate that sweeps across and under the several elevator-plates, as shown in dotted lines in said figure. Movement is imparted to the stripper-plate from the line-moving lever 71 by connections, (best shown in Figs. 2, 48, and 49, (wherein a lever 128 for imparting sweeping motion to the stripper-plate, pivoted near its lower end to a suitable part of the machine-frame, is connected at its said lower end by means of a link 129 to one end of a Y-lever 130, in the fork of which works a roller-stud 130$^a$, carried by the carriage-moving lever. When the line-carriage is in initial line-receiving position, the parts are in the relative position indicated in full lines in Fig. 48. The line-moving lever traverses the dotted-line arc shown in said figure. The roller-stud thereon acts upon the Y-lever and throws the same into the dotted-line position shown, whereby the stripper-plate will be brought to its initial position preparatory to its operation of stripping the matrix-bars from the elevator-plates and will remain at rest in that position while the roller-stud rides out on the inactive surface of one member of the Y-lever. During a portion of the return of the line-carriage to initial line-receiving position this roller-stud will travel back upon such inactive surface, during which time the matrix-bars will be lifted out of the carriage by the lifter-plates and brought into proper position to be transferred onto the matrix-suspending rails or hangers appropriated to the several magazine-cells. At this time the roller-stud will engage the other member of the Y-arm, throwing the latter from the dotted-line position to the full-line position illustrated in said figure and imparting to the stripper a sweeping movement across and under the matrix-bar-elevator plates, whereby the matrix-bars strung upon the stringer elements of said plates and pendent therefrom are cleared therefrom and delivered onto the matrix-bar hangers of the magazine.

A complete cycle of operation has been described.

The operation of the machine is initiated in the usual manner by means of the starting-lever 68, which moves a slide 131 to set the Scudder type of clutch (designated by the numeral 132.) When a cycle of operation is completed, the machine is unclutched from the driving power, as in the Scudder patent, No. 605,141. I provide the dog 133 (which corresponds to the element 289 in said Scudder patent) with a safety feature to unclutch the machine in case of reverse motion of the driving-gear. This feature consists in providing an additional bevel 133$^a$ (see Fig. 50, Sheet 7) on the dog to engage the unclutching devices.

While my invention is particularly intended as an improvement in monoline composing-machines, it is obvious that many features thereof will be useful in connection with type composing and casting machines of other description, and as to those features it is to be understood that my invention is not limited thereto when embodied in a monoline composing-machine.

The special form of matrix shown in this application forms the subject of an application for Letters Patent filed on the 29th day of December, 1906, Serial No. 350,070.

Having thus fully described the invention, what is claimed as new is—

1. In a monoline composing-machine, in combination with a composing-box, a series of matrix-bar arresters, and a series of movable matrix-bar keepers combined for coöperation therewith.

2. In a monoline composing-machine, in combination, a series of movable matrix-bar arresters, and a series of movable matrix-bar keepers combined for synchronous operation.

3. In a monoline composing-machine, in combination with a composing-box, a series of pivotally-mounted matrix-bar arresters, a series of pivoted matrix-bar keepers, said arresters and keepers being arranged in cooperative pairs, and said arresters engaging the said keepers for withdrawing the latter from the matrix-bar drop-space of the composing-box when the former are withdrawn from such space.

4. In a monoline composing-machine, in combination with a composing-box, a series of matrix-bar arresters, and a series of matrix-bar keepers combined for coöperation therewith, and means actuated by finger-key mechanism for operating said keepers and arresters.

5. In a monoline composing-machine, in combination with a composing-box, a series of pivoted matrix-bar arresters, a series of pivoted matrix-bar keepers combined for coöperation therewith, and means actuated by finger-key mechanism for operating said arresters and keepers.

6. In a monoline composing-machine, in combination with a composing-box, a series of pivoted matrix-bar arresters, a series of pivoted matrix-bar keepers combined for coöperation therewith, and a series of slides actuated from finger-key mechanism for operating said arresters.

7. In a monoline composing-machine, in combination with a composing-box, of a series of matrix-bar arresters, means for projecting said arresters into the drop-space of the composing-box, a series of matrix-bar keepers combined for coöperation with said arresters and normally held clear of the said drop-space by said arresters and adapted to automatically enter said space when the corresponding arrester is projected into said space, and means for simultaneously withdrawing said arresters and said keepers from said space.

8. In a monoline composing-machine, in combination with a composing-box, of a series of pivoted matrix-bar arresters, a series of matrix-bar keepers provided with cams, said arresters provided with an element to movably engage said cams whereby the keepers are released and permitted to be projected into the matrix-bar drop-space of the composing-box and be withdrawn therefrom when the matrix-bar arresters are withdrawn.

9. In a monoline composing-machine, in combination with a composing-box, of a series of pivoted matrix-bar arresters, a series of matrix-bar keepers provided with cams, said arresters provided with an element to movably engage said cams whereby the keepers are released and permitted to be projected into the matrix-bar drop-space of the composing-box and be withdrawn therefrom when the matrix-bar arresters are withdrawn, and means actuated from finger-key mechanism for operating said arresters and keepers.

10. In a monoline composing-machine, in combination with a composing-box, a series of matrix-bar arresters, and a series of matrix-bar keepers arranged in coöperative pairs, the arrester and keeper elements of each pair being out of alinement with each other whereby the arrester is adapted to engage beneath the bottom of a matrix-bar and the keeper engage a recess in said bar.

11. In a monoline composing-machine, in combination with a composing-box, a series of pivoted matrix-bar arresters, and a series of pivoted matrix-bar keepers arranged in coöperative pairs, the arrester and keeper elements of each pair being out of alinement with each other whereby the arrester is adapted to engage beneath the bottom of a matrix-bar and the keeper engage a recess in said bar.

12. In a monoline composing-machine, in combination with a composing-box, a series of matrix-bar arresters provided with drop-bar-engaging portions, a series of matrix-bar keepers combined for coöperation with said arresters and having their bar-engaging portions in a plane different from the bar-engaging portions of the arresters, and means for operating said arresters and keepers.

13. In a monoline composing-machine, in combination with a composing-box, a series of matrix-bar arresters provided with drop-bar-engaging portions, a series of matrix-bar keepers combined for coöperation with said arresters and having their bar-engaging portions in a plane different from the bar-engaging portions of the arresters, and means for operating said arresters and keepers in substantial synchronism.

14. In a monoline composing-machine, in combination with a composing-box, a series of matrix-bar arresters provided with drop-bar-engaging portions, a series of matrix-bar keepers combined for coöperation with said arresters and having their bar-engaging portions in a plane different from the bar-engaging portions of the arresters, and means actuated by finger-key mechanism for operating said arresters and keepers in substantial synchronism.

15. In a monoline composing-machine, in combination with a composing-box, a series of matrix-bar arresters provided with drop-bar-engaging portions, a series of matrix-bar keepers combined for coöperation with said arresters and having their bar-engaging portions in a plane different from the bar-engaging portions of the arresters, the raised rear ends of the matrix-bar arresters adapted to engage said keepers whereby the latter are withdrawn from the matrix-bar drop-space of the composing-box when the former are withdrawn.

16. In a monoline composing-machine, in combination with a composing-box, a series of matrix-bar arresters, means for operating said arresters, a series of matrix-bar keepers combined for coöperation with said arresters and the operation of which is controlled by said arresters.

17. In a monoline-machine, a composing-box to receive the successive descending matrices, in combination with a laterally-movable bridge arranged to enter the edge of each matrix, and an alining-rail located outside of the box and forming the continuation of the bridge to receive the matrices therefrom; whereby each matrix is given a continuous support at one edge both within and without the composing-box.

18. In a monoline composing-machine, in combination with a composing-box, of a pivoted bridge for supporting and guiding matrix-bars to an alining-rail outside of the composing-box.

19. In a monoline composing-machine, matrix-bars notched in one edge, in combination with a composing-box into which the matrices descend one at a time, and an automatic reciprocating bridge arranged to enter the box and the edge of each matrix to sustain the latter as it is advanced toward the composed line.

20. In a monoline composing-machine, the combination of a composing-box to receive the successive matrices, a bridge movable edgewise in relation to the matrices to sustain them during their delivery toward the composed line, and a matrix-ejector acting at the beginning of its advance to cause the engaging movement of the bridge.

21. In a monoline composing-machine, in combination with a composing-box, of means for ejecting matrix-bars from said box onto an alining-rail located outside thereof, and a pivoted bridge operated by the ejecting means arranged in said composing-box for supporting and guiding matrix-bars onto said alining-rail.

22. In a monoline composing-machine, in combination with a composing-box, means for ejecting matrix-bars from said box onto an alining-rail located outside of the box, and a pivoted bridge arranged in the box for supporting and guiding the matrix-bars onto said rail, said bridge provided with a cam engaging a recess in the ejector whereby it is operated by and in unison with said ejector.

23. In a monoline composing-machine, a composing-box into which the successive matrices descend, a front wall or plate arranged to enter through one side of the composing-box and advance across the same to the opposite side and adapted in itself to hold the matrices in position therein, a horizontal ejector for delivering the matrices from the box, and means for withdrawing the wall-plate bodily to permit delivery of the matrices.

24. In a monoline composing-machine, in combination with a composing-box, of a movable front wall and a division or partition wall associated therewith and normally extending into the matrix-bar space of said composing-box, and means for withdrawing said front wall and division-wall to permit of the passage of matrix-bars out of said box.

25. In a monoline composing-machine, in combination with a composing-box and an oscillator, of a movable front wall for the composing-box normally guarding the matrix-bar drop-space thereof, a cam mounted in the oscillator and adapted to intermittently engage the oscillator-shaft, and a connection between said cam and front wall whereby the latter is intermittently withdrawn from in front of the composing-space to permit passage of the matrix-bars out of the composing-box.

26. In a monoline-machine, a composing-box into which the matrix-bars successively descend, in combination with a series of matrix-bar arresters, a laterally-movable bridge for supporting and guiding the matrix-bars as they are delivered from the box, a retractable front wall to aid in guiding the matrix-bars into the box, a horizontally-moving ejector, and means for operating said members in proper order, substantially as described.

27. In a monoline composing-machine, in combination with a composing-box, of a series of matrix-bar arresters, a series of matrix-bar keepers, a bridge for supporting and guiding matrix-bars in said box, a movable front wall for the matrix-bar drop-space, and means for operating said arresters, keepers, bridge, and front wall.

28. In a monoline composing-machine, in combination with a composing-box, a series of matrix-bar arresters, and a series of matrix-bar keepers combined for coöperation therewith, means for operating said arresters and keepers, means for ejecting matrix-bars from said box onto an alining-rail located outside thereof, and a movable bridge arranged in said box and operated by said ejector.

29. In a monoline composing-machine, in combination with a composing-box, a series of matrix-bar arresters, and a series of matrix-bar keepers combined for coöperation therewith, means for operating said arresters and keepers, means for ejecting matrix-bars from said box onto an alining-rail located outside thereof, a movable bridge arranged in said box and operated by said ejector, a movable front wall, and means for operating the same.

30. In a type-composing mechanism, an abutment movable in the direction of the length of the composed line, a support for said abutment having a sliding connection therewith, a connecting-spring tending to hold the abutment against the advance of the line, and a pivot for the support lying transversely to the length of the line, whereby the abutment is permitted to move bodily backward out of the path of the line to permit the advance of the latter.

31. In a composing mechanism, a line-abutment comprising a piston having at one end line-engaging fingers adapted to enter and move along the line-race, a transversely-pivoted barrel supporting said piston, and a spring connecting the piston and barrel.

32. In a composing mechanism, a resistant movable in advance of the composed line, a support for the resistant having a longitudinal sliding connection therewith, said support pivoted that it may carry the resistant out of the path of the line, and a spring tending to hold the resistant against the advancing line.

33. In a machine for composing and casting type, a line-carriage comprising a line-moving wing, a movable head-block and a line-lock-up arm connected with the wing, movable therewith, and adapted to engage with said head-block for locking up the line during the performance of the operations where it is desired that the line be locked up, and for releasing or relieving the line to facilitate distribution thereof.

34. In a machine for composing and casting type, in combination with a line-carriage comprising a line-moving wing, a movable head-block, a line-lock-up arm adapted to engage the said block, means for moving said wing and arm into and withdrawing the same from operation upon the line, means for maintaining the same in coöperative relation with the line and head-block, means for relieving the pressure of the lock-up arm upon the head-block to facilitate distribution of the line, and means for withdrawing said arm and wing from the line-race when the line has been removed therefrom.

35. In a type composing and casting machine, in combination with a line-carriage, comprising a line-moving wing, a movable head-block provided with a recess, and a line lock-up provided with a pusher, means for causing the pusher to force the head-block closely against the line, means for maintaining the line lock-up during the line conveying and casting operation, and means for permitting limited movement of the line-lock-up arm to enable its pusher element to enter the recess in the head-block, whereby the line is released or relieved to facilitate distribution.

36. In a type casting and composing machine, in combination with a line-carriage, comprising a line-moving wing, a movable head-block having a recess, and a line-lock-up arm having a head-block pusher, means for maintaining coöperative relation of said elements with respect to a locked-up line during line conveying and casting operations, means for withdrawing said wing and arm from line-engaging position, and a stop for arresting the movement of the line-lock-up arm when its pusher has entered the recess in the head.

37. In a type composing and casting machine assembly and line-transferring mechanism, comprising a stationary assembly-rail arranged and proportioned to enter part way only into the alining-recesses of matrix-bars, a line-carriage; a traveling alining-rail arranged to enter the full depth of the alining-recesses, and means for causing said rail to engage and support the line during transit.

38. In a monoline-machine, the combination of a stationary assembling-rail 28 to temporarily sustain the composed matrices, a carriage to transport the composed line from the stationary rail to the casting position, an alining-bar movably mounted in the carriage to engage and hold the matrices, and means for advancing said bar into the notched edges of the matrices beyond the depth to which the assembling-rail enters; whereby exact alinement of the matrices is secured and maintained notwithstanding their wear upon the stationary rail.

39. In a type composing and casting machine, the combination with a fixed assembly-rail and a line-carriage, of a traveling alining-rail, connected to and partaking of the movement of the carriage, said traveling alining-rail provided with a longitudinal channel, a slide on which said alining-rail is mounted, provided with pins engaging cam-slots in said alining-rail, pins interposed in the path of movement of the said alining-rail, one of said pins arranged to stop the longitudinal travel of the alining-rail until the said rail has fully engaged the matrix-bars and is clear of said pin, and the other thereof arranged to stop the travel of the alining-rail until the same is withdrawn from engagement with such matrix-bars and is in coincidence with the longitudinal groove in said rail.

40. In a type composing and casting machine, a shiftable mold, means for shifting the same, and a connection between said mold and shifting means to facilitate disconnection and substitution of molds, consisting of a link having dowel connection with the mold and with the mold-shifting means, an overhanging ledge on the mold to engage one end of the link, and a button on the mold-shifting means adapted to be turned to overlie the dowel connection of the link with such means and to be turned to uncover such dowel connection, that end of the link which is connected to the mold being mutilated or cut away so that when it is turned in proper relative angle to the mold the link may be readily removed.

41. In a type composing and casting machine, the combination with a shiftable mold and a trimming-knife arranged in front thereof, and means for shifting the mold, of a link connecting the mold with the shifting means, a trimming-knife wiper pivotally mounted upon the said link, and a guard operatively interposed between the mold and trimming-knife adapted to engage said wiper and keep it out of contact with the trimming-knife in one movement of the mold, and permit said wiper to engage said knife in the other movement of the mold.

42. In a type composing and casting machine, matrix-distributing mechanism comprising matrix-lifting plates having matrix-stringing elements and means for lowering and lifting said plates to matrix-stringing position and matrix-distributing position comprising an elevator and a post provided with a spiral groove, a gear mounted for reciprocal movement upon said post, connected with said elevator, operatively meshing with said lifter-plates, and provided with means engaging said spiral groove for imparting rotation to said gear and reciprocating movement to said plates.

43. In a type composing and casting machine, matrix-distributing mechanism comprising matrix-lifting plates having matrix-stringing elements and means for lowering and lifting said plates to matrix-stringing position and matrix-distributing position comprising an elevator and a post provided with a groove in part spirally arranged and in part parallel with the movement of the elevator, whereby said lifter-plates move first in a right line to lift the matrix-bars and spacers clear of the line-carriage and then rearwardly to bring their stringer elements in alinement with the hanger elements of the magazine.

44. In a type composing and casting machine, distributing mechanism comprising a vertically reciprocatory elevator, lifter-plates arranged to reciprocate horizontally in said elevator and provided with slots of varying length, one of said plates provided with a rack, and a pin entering the slots of the other plates, a post provided with a groove in part spiral and in part parallel with the movement of said elevator, a gear in mesh with said rack and mounted to reciprocate upon said post and partaking of the movements of the elevator, and provided with means engaging the groove in the post for imparting rotary movement to said gear and reciprocating movement to said lifter-plates.

45. In a type composing and casting machine, a line-carriage and a lever for moving the same, of distributer mechanism comprising matrix-lifters, and a sweep for removing matrices from said lifters onto the hanger elements of the magazine, said sweep being connected to and actuated by the line-carriage lever.

46. In a type composing and casting mechanism, the combination with a magazine, of means for discharging matrices from said magazine comprising an oscillator, a continuously-rotating shaft and a cam on said oscillator adapted to intermittently engage said shaft, and means for adjusting the relation between said shaft and cam to regulate the throw of the oscillator.

47. In a type composing and casting mechanism, the combination with a magazine, of means for discharging matrices from said magazine comprising an oscillator, a continuously-rotating shaft and a cam on said oscillator adapted to intermittently engage said shaft, and an eccentric associated with said shaft for adjusting the relation between said shaft and cam to regulate the throw of the oscillator.

48. In a monoline-machine, in combination with a composing-box, a series of arresters to support the falling matrix-bars, and a corresponding series of keepers adapted to engage the bars and prevent them from rebounding.

49. In a monoline composing-machine, in combination with a composing-box, a series of arresters adapted to act at one end of the matrix-bars to determine their descent, and a series of keepers adapted to engage one edge of the matrix-bars and combined for synchronous coöperation with the arresters.

50. In a monoline-machine, in combination with a composing-box, movable means for arresting the matrix-bars at various heights, and means engaging one edge of the matrix-bars to prevent rebound thereof, the last-named means being operated by the first, substantially as described.

51. In a monoline-machine, and in combination with the mold having an overhanging ledge, a detachable actuating device for said mold comprising a link pivotally connected with the mold and cut away in such manner as to permit its disconnection when turned to an inoperative position.

52. In a monoline composing-machine, in combination with a composing-box, means for supporting the matrix-bars at various heights, means engaging in one edge of the matrix-bars to prevent the rebound thereof when supported, said last-mentioned means actuated to engage in one edge of the matrix-bars by the first-mentioned means when the latter is moved to supporting position, and operating means for said supporting means.

53. In a monoline composing-machine, in combination with a composing-box, means for supporting the matrix-bars at various heights, means engaging in one edge of the matrix-bars to prevent the rebound thereof when supported, said last-mentioned means actuated to engage in one edge of the matrix-bars by the first-mentioned means when the latter is moved to supporting position, and means actuated by finger-key mechanism for operating said supporting means.

54. In a monoline composing-machine, in combination with a composing-box, means for supporting the matrix-bars at various heights, means engaging in one edge of the matrix-bars to prevent the rebound thereof when supported, said last-mentioned means actuated to engage in one edge of the matrix-bars by the first-mentioned means when the latter is moved to supporting position, and means for withdrawing to inoperative position the said supporting and engaging means.

55. In a monoline composing-machine, in combination with a composing-box, means for supporting the matrix-bars at various heights, means engaging in one edge of the matrix-bars to prevent the rebound thereof when supported, said last-mentioned means actuated to engage in one edge of the matrix-bars by the first-mentioned means when the latter is moved to supporting position, and means for simultaneously withdrawing to inoperative position the supporting and engaging means.

56. In a monoline-machine, a removable box to receive the descending matrices, in combination with matrices notched in one edge, means for ejecting the matrices sidewise from the box, a receiving-rail outside of the box in position to enter the matrix-notches, and means within the box arranged to enter the same notches and guide the matrices upon the outside rail.

57. In a monoline composing-machine, the combination with a composing-box, of means for arresting the matrix-bars, means for retaining the matrix-bars from the rebound when arrested, means for supporting and guiding matrix-bars in said box, a movable front wall for the matrix-bar space, and means for operating said arresting, retaining, supporting and guiding means and said front wall.

58. In a monoline composing-machine, in combination with a composing-box, means for supporting the matrix-bars at various heights, means engaging in one edge of the matrix-bars to prevent the rebound thereof when supported, said last-mentioned means actuated to engage in one edge of the matrix-bars by the first-mentioned means when the latter is moved to supporting position, and slides actuated from finger-key mechanism for operating said arresters.

59. In a composing mechanism for monoline-machines, means for arresting the matrices at different heights, and a series of devices at different heights to engage the matrices and prevent them from rebounding.

60. In a monoline-machine, the matrices each having a detaining-notch, in combination with means for arresting the matrices at different heights, and a series of keepers or detents arranged to enter said notch one at a time according to the height of the matrix.

61. In a monoline-machine, the combination with the matrices having a series of characters and alining notches, of a composing mechanism including means for arresting the matrices at different heights, and means engaging the matrices at the lower extremity to prevent their rebound.

62. In a monoline-machine, a composing-box, means for delivering the matrices successively downward into said box, a plate to form one wall of the box to prevent the matrices from falling forward, said plate being arranged to advance through the side wall of the box and across the same to the opposite side, and mechanism for automatically retracting the plate to prevent the delivery of the matrices from the box to the line.

63. In a monoline composing mechanism, and in combination with a composing-box, the two plates 32 and 32ª, an ejector for delivering the matrices laterally from the box, and means for alternately advancing the plates and the ejector.

In testimony whereof I have hereunto set my hand in presence of two subscribing witnesses.

JAMES McNAMARA.

Witnesses:
M. W. ALEXANDER,
FRANCIS M. FLOOD.